US012292761B2

(12) United States Patent
Zhang et al.

(10) Patent No.: US 12,292,761 B2
(45) Date of Patent: May 6, 2025

(54) ELECTRONIC DEVICE

(71) Applicant: Honor Device Co., Ltd., Shenzhen (CN)

(72) Inventors: Yaolei Zhang, Shenzhen (CN); Guotong Zhou, Shenzhen (CN); Yilin Lu, Shenzhen (CN); Bo Liu, Shenzhen (CN)

(73) Assignee: Honor Device Co., Ltd., Shenzhen (CN)

( * ) Notice: Subject to any disclaimer, the term of this patent is extended or adjusted under 35 U.S.C. 154(b) by 0 days.

(21) Appl. No.: 18/015,473

(22) PCT Filed: Aug. 19, 2022

(86) PCT No.: PCT/CN2022/113555
§ 371 (c)(1),
(2) Date: Jan. 10, 2023

(87) PCT Pub. No.: WO2023/109164
PCT Pub. Date: Jun. 22, 2023

(65) Prior Publication Data
US 2024/0264629 A1 Aug. 8, 2024

(30) Foreign Application Priority Data

Dec. 16, 2021 (CN) .......................... 202111547810.5

(51) Int. Cl.
*G06F 1/16* (2006.01)
*G09F 9/30* (2006.01)
*H04M 1/02* (2006.01)

(52) U.S. Cl.
CPC .......... *G06F 1/1618* (2013.01); *G06F 1/1652* (2013.01); *G06F 1/1656* (2013.01);
(Continued)

(58) Field of Classification Search
CPC .... G06F 1/1618; G06F 1/1652; G06F 1/1656; G06F 1/1681; G09F 9/301; H04M 1/0216; H04M 1/0268
See application file for complete search history.

(56) References Cited

U.S. PATENT DOCUMENTS 10,674,617 B2    6/2020   Lin et al.
11,307,613 B2 *  4/2022   Yu ......................... G06F 1/1681
(Continued)

FOREIGN PATENT DOCUMENTS

CN    108953864 A    12/2018
CN    109859642 A    6/2019
(Continued)

*Primary Examiner* — Rockshana D Chowdhury
*Assistant Examiner* — Martin Antonio Asmat Uceda
(74) *Attorney, Agent, or Firm* — Leydig, Voit & Mayer, Ltd.

(57) ABSTRACT

An electronic device includes a housing, a flexible display module, a protection plate, a first connector, and a first base plate. The housing includes a rotating assembly and two supporters. The rotating assembly is disposed between the two supporters. The supporter is rotatably connected to the rotating assembly. The flexible display module is covered on the housing. The flexible display module includes a backplane. The backplane includes a bendable area. The bendable area is disposed facing the rotating assembly. The protection plate is disposed between the backplane and the housing. One of the backplane and the protection plate is connected to the first base plate. A part of the protection plate is located between the bendable area and the housing. The first connector connects the backplane and the protection plate. The first connector is disposed on an outer side of the bendable area of the backplane.

17 Claims, 17 Drawing Sheets

(52) U.S. Cl.
CPC .......... *G09F 9/301* (2013.01); *H04M 1/0216* (2013.01); *G06F 1/1681* (2013.01); *H04M 1/0268* (2013.01)

(56) References Cited

U.S. PATENT DOCUMENTS

| | | | | |
|---|---|---|---|---|
| 11,343,927 B2* | 5/2022 | Choi | .................... | G06F 1/1652 |
| 11,442,202 B2* | 9/2022 | Park | .................... | H05K 5/0017 |
| 11,501,668 B2* | 11/2022 | Wang | .................... | G06F 1/1652 |
| 11,528,819 B2* | 12/2022 | Lee | .................... | H04M 1/0268 |
| 11,609,606 B2* | 3/2023 | Myeong | ................ | G06F 1/1681 |
| 11,714,456 B2* | 8/2023 | Zhou | .................... | G06F 1/1641 |
| | | | | 428/174 |
| 2019/0251927 A1 | 8/2019 | Ma | | |
| 2021/0072791 A1 | 3/2021 | Yu et al. | | |
| 2021/0092855 A1 | 3/2021 | Choi | | |
| 2021/0174711 A1 | 6/2021 | Cho et al. | | |
| 2021/0280806 A1 | 9/2021 | Park et al. | | |
| 2022/0093014 A1* | 3/2022 | Kishimoto | ................ | B32B 3/16 |
| 2022/0173353 A1 | 6/2022 | Luo et al. | | |
| 2023/0051260 A1* | 2/2023 | An | .................... | H04M 1/02 |
| 2023/0354565 A1* | 11/2023 | Yin | .................... | B32B 37/22 |

FOREIGN PATENT DOCUMENTS

| | | |
|---|---|---|
| CN | 110493386 A | 11/2019 |
| CN | 211742523 U | 10/2020 |
| CN | 112349209 A | 2/2021 |
| CN | 112419890 A | 2/2021 |
| CN | 112466205 A | 3/2021 |
| CN | 112735263 A | 4/2021 |
| CN | 112786622 A | 5/2021 |
| CN | 113067922 A | 7/2021 |
| CN | 214476073 U | 10/2021 |
| CN | 113744634 A | 12/2021 |
| CN | 113793552 A | 12/2021 |
| IN | 108230907 A | 6/2018 |
| KR | 1020190043349 A | 4/2019 |
| WO | 2018205956 A1 | 11/2018 |

* cited by examiner

ELECTRONIC DEVICE

CROSS-REFERENCE TO RELATED APPLICATIONS

This application is a national stage of International Application No. PCT/CN2022/113555, filed on Aug. 19, 2022, which claims priority to Chinese Patent Application No. 202111547810.5, filed on Dec. 16, 2021. The disclosures of both of the aforementioned applications are hereby incorporated by reference in their entireties.

TECHNICAL FIELD

Embodiments of this application relate to the field of terminal technologies, and in particular, to an electronic device.

BACKGROUND

With the explosive growth of electronic devices such as a smartphone or portable equipment (e.g., portable Android® device (PAD)), the electronic devices offer more and more functions. For electronic devices with displays of different areas, relevant functions of the electronic devices offer different experience. Display areas of the displays of the electronic devices are increasingly large. However, when the display area of an electronic device is large, an overall size of the electronic device is relatively large, and the electronic device is not easy to carry. With development of display technologies, a flexible display module may be processed and manufactured.

The flexible display module includes a flexible display and a backplane. Compared with a conventional screen, the flexible display has a significant advantage. For example, the flexible display are bendable and flexible. Therefore, the flexible display can be applied to a foldable electronic device, so as to implement flexible change of a display area, and the folded electronic device has a small size, and is easy to carry. The flexible display needs to use a backplane as a substrate, so that the backplane can provide support for the flexible display, and ensure that the flexible display is even. The backplane includes a bendable area. When parts that are of the backplane and that are located on both sides of the bendable area move close to each other because of an external force, the bendable area can be bent and deformed. In addition, the flexible display and the backplane are synchronously bent. In a related technology, the bendable area of the flexible display of the electronic device is uneven, and consequently, when the flexible display is observed in an off-screen state, reflected light and shadow are deformed, which affects use experience of the flexible display.

SUMMARY

Embodiments of this application provide an electronic device, so as to resolve a problem that reflected light and shadow on the flexible display are deformed due to an uneven bendable area of the flexible display.

This application provides an electronic device, and the electronic device includes at least a housing, a flexible display module, a protection plate, a first connector, and a first base plate. The housing includes at least a rotating assembly and two supporters. The rotating assembly is disposed between the two supporters. The supporter is rotatably connected to the rotating assembly. The flexible display module is covered on the housing. The flexible display module includes a backplane. The backplane includes a bendable area. The bendable area of the backplane is disposed facing the rotating assembly. The protection plate is disposed between the backplane and the housing. One of the backplane and the protection plate is connected to the first base plate. A part of the protection plate is located between the bendable area of the backplane and the housing. The first connector connects the backplane and the protection plate. The first connector is disposed on an outer side of the bendable area of the backplane. The first base plate is disposed between the backplane and the protection plate. The first base plate is located on one side that is of the first connector and that faces the bendable area. At least a part of the first base plate is located on the outer side of the bendable area.

In the electronic device according to this embodiment of this application, a part that is of the backplane and that is close to the bendable area is not limited or restricted by the first base plate and the protection plate, so that when being subjected to a force along a thickness direction, the backplane may move relative to the protection plate, for example, the backplane may move away from the protection plate and cause warping deformation. Therefore, when the bendable area of the backplane generates a bump and deformation, under the action of internal stress, due to stress concentration, deformation of the bendable area may be transmitted to an area that is of the backplane and that is close to the bendable area, so as to drive the area that is of the backplane and that is close to the bendable area to move away from the protection plate to cause the warping deformation. Therefore, a relatively gentle and smooth transition can be implemented between the part that is of the backplane and that is close to the bendable area and the bendable area, stress of the bendable area is released, and a degree of deformation of the bendable area can be reduced, so that an abrupt height difference change occurs between the bendable area and a surface of that is of the backplane and that is close to a part of the bendable area, thereby causing a possibility of unevenness of the flexible display, and reducing a possibility of deformation of reflected light and shadow on the flexible display.

In a possible implementation, the protection plate is connected to the first base plate. The backplane and the first base plate may come into contact with each other or be freely separated from each other. If the first base plate is disposed on the backplane, because the backplane has a relatively small thickness, the disposed first base plate has a possibility of strengthening stiffness of a corresponding area on the backplane, so that a deformation capability of the backplane corresponding to the area of the first base plate is weaker than a deformation capability of another area, and therefore there is a possibility of inconsistent deformation of the backplane, which affects a display effect of the flexible display. In this embodiment, a manner in which the first base plate is fastened to the protection plate may avoid the foregoing case.

In a possible implementation, the protection plate is bonded to the first base plate, so that no additional connection component such as a screw, a buckle, or a rivet needs to be disposed between the protection plate and the first base plate. Therefore, on one hand, complexity of a connection structure between the protection plate and the first base plate is reduced, and assembling difficulty is reduced. On the other hand, a corresponding connection structure, such as a hole, does not need to be disposed on the protection plate and the first base plate, which reduces processing difficulty of the protection plate and the first base plate.

In a possible implementation, a material of the first base plate is an insulating material, so that the first base plate insulates and isolates the flexible display module and the protection plate, thereby reducing a possibility that an electrical signal is transmitted between the protection plate and the flexible display module by using the first base plate.

In a possible implementation, the first base plate is wholly located on the outer side of the bendable area. A manner in which the first base plate is wholly located on the outer side of the bendable area can reduce a processing precision requirement of the backplane, the first base plate, and the protection plate, and avoid a case in which the first base plate jacks up the bendable area.

In a possible implementation, a maximum thickness of the first connector is equal to a maximum thickness of the first base plate, so that a surface that is of the first connector and that faces the backplane may be flush with a surface that is of the first base plate and that faces the backplane. Therefore, when both the first connector and the first base plate come into contact with the backplane, any one of the first connector and the first base plate does not exert a jacking force on the backplane to cause the backplane to generate a bump and deformation.

In a possible implementation, the protection plate includes a through hole. The through hole is located on the outer side of the bendable area of the backplane. The electronic device further includes a second connector. The second connector passes through the through hole and connects the backplane and the housing. The first connector and the first base plate are disposed around the second connector. The backplane is connected to the housing by using the first connector and the protection plate, and is connected to the housing by using the second connector, thereby improving stability of a connection between the backplane and the housing.

In a possible implementation, one of the first connector and the first base plate is connected to the second connector.

In a possible implementation, the second connector is a bonding member, so that no additional connection component such as a screw, a buckle, or a rivet needs to be disposed between the housing and the backplane. Therefore, on one hand, complexity of a connection structure between the housing and the backplane is reduced, and assembling difficulty is reduced. On the other hand, a corresponding connection structure, such as a hole, does not need to be disposed on the housing and the backplane, which reduces processing difficulty of the housing and the backplane, and improves structural integrity of the housing and the backplane.

In a possible implementation, there is a spacing between a wall surface that is of the first connector and that faces the through hole and an edge of the through hole, so that a step structure is formed between the first connector and the protection plate. When glue is injected into a position of the through hole, a part of the glue flows to an area exposed by the protection plate, and a part of the second connector formed after the glue is cured is located between the protection plate and the backplane. Therefore, the second connector may be limited or restricted by the protection plate, so that the second connector cannot easily fall out of the through hole and be separated from the protection plate.

In a possible implementation, there is a spacing between a wall surface that is of the first base plate and that faces the through hole and the edge of the through hole, so that a step structure is formed between the first base plate and the protection plate. When glue is injected into a position of the through hole, a part of the glue flows to an area exposed by the protection plate, and a part of the second connector formed after the glue is cured is located between the protection plate and the backplane. Therefore, the second connector may be limited or restricted by the protection plate, so that the second connector cannot easily fall out of the through hole and be separated from the protection plate.

In a possible implementation, more than two through holes are spaced along an axial direction of a rotating shaft of the rotating assembly. A glue dispensing device controls the amount of glue dispensed at a time, so that after glue dispensing is performed on each through hole, it can be ensured that the through hole is filled with sufficient glue, and a case in which the glue is not controlled accurately because a size of the through hole is excessively large can be avoided, thereby improving glue dispensing efficiency, and reducing a possibility that the through hole is filled with insufficient glue or the glue overflows after the through hole is filled with excessive glue. In addition, a manner in which a plurality of through holes are disposed on the protection plate may avoid a case in which an overall stiffness of the protection plate is low due to large sizes of the through holes.

In a possible implementation, the first connector is a bonding member, so that no additional connection component such as a screw, a buckle, or a rivet needs to be disposed between the protection plate and the backplane. Therefore, on one hand, complexity of a connection structure between the protection plate and the backplane is reduced, and assembling difficulty is reduced. On the other hand, a corresponding connection structure, such as a hole, does not need to be disposed on the protection plate and the backplane, which reduces processing difficulty of the protection plate and the backplane, and improves structural integrity of the protection plate and backplane.

In a possible implementation, a thickness of the backplane is greater than a thickness of the protection plate. Compared with the backplane, the protection plate has lower stiffness, so that the protection plate can be easily bent and deformed relative to the backplane. This reduces a possibility that the protection plate exerts great resistance on a bending process of the backplane because the protection plate cannot be bent and affects the stability of the bending process of the backplane.

In a possible implementation, a material of the backplane includes at least one of iron, titanium, nickel, and chromium elements. Alternatively, a material of the protection plate includes at least one of iron, titanium, nickel, and chromium elements.

In a possible implementation, the bendable area is a stiffness weakening area.

In a possible implementation, the electronic device further includes a third connector. The third connector connects the protection plate and the housing, so that the protection plate cannot easily move, and then relative positions of the protection plate and the housing cannot easily change.

In a possible implementation, the third connector is a bonding member, so that no additional connection component such as a screw, a buckle, or a rivet needs to be disposed between the protection plate and the housing. Therefore, on one hand, complexity of a connection structure between the protection plate and the housing is reduced, and assembling difficulty is reduced. On the other hand, a corresponding connection structure, such as a hole, does not need to be disposed on the protection plate and the housing, which reduces processing difficulty of the protection plate and the housing, and improves structural integrity of the protection plate and the housing.

In a possible implementation, the electronic device further includes a second base plate. One of the backplane and the protection plate is connected to the second base plate. The second base plate is located on one side that is of the first base plate and that is away from the first connector. At least a part of the second base plate is located between the bendable area and the protection plate. The second base plate may separate the backplane from the protection plate, so that when the backplane is bent, there is no direct contact between the bendable area and the protection plate, but the bendable area and the protection plate may separately come into contact with the second base plate, thereby reducing a possibility that the bendable area and the protection plate generate noise or structural abrasion due to mutual impact or relative slip after the bendable area and the protection plate directly come into contact with each other.

In a possible implementation, a thickness of the second base plate is less than a thickness of the first base plate, so that a surface that is of the first base plate and that faces the backplane is higher than a surface that is of the second base plate and that faces the backplane. Because a spacing between the bendable area of the backplane and a protection plate is relatively small, and there are errors in thicknesses of the backplane, the second base plate, and the protection plate in a processing and manufacturing process, when the thickness of the second base plate is greater than a spacing between the bendable area and the protection plate, the second base plate exerts a jacking force on the bendable area, so that the bendable area generates a bump. In this embodiment, a manner in which the thickness of the second base plate is less than the thickness of the first base plate can reduce a processing precision requirement of the backplane, the second base plate, and the protection plate, and avoid a case in which the second base plate jacks up the bendable area.

In a possible implementation, the protection plate is bonded to the second base plate, so that no additional connection component such as a screw, a buckle, or a rivet needs to be disposed between the protection plate and the second base plate. Therefore, on one hand, complexity of a connection structure between the protection plate and the second base plate is reduced, and assembling difficulty is reduced. On the other hand, a corresponding connection structure, such as a hole, does not need to be disposed on the protection plate and the second base plate, which reduces processing difficulty of the protection plate and the second base plate.

In a possible implementation, a material of the second base plate is an insulating material, so that the second base plate may insulate and isolate the backplane and the protection plate, thereby reducing a possibility that an electrical signal is transmitted between the backplane and the protection plate by using the second base plate.

In a possible implementation, the first base plate and the second base plate are integrally formed. Both the first base plate and the second base plate are connected to the protection plate. Alternatively, both the first base plate and the second base plate are connected to the backplane.

In a possible implementation, the electronic device further includes a third base plate. The third base plate is located between the protection plate and the housing. The third base plate may separate the housing from the protection plate. There is no direct contact between the housing and the protection plate, but the housing and the protection plate may separately come into contact with the third base plate, thereby reducing a possibility that noise or structural abrasion occurs between the housing and the protection plate due to mutual impact or relative slip after the housing and the protection plate directly come into contact with each other.

In a possible implementation, the third base plate is located on one side that is of the first base plate and that is away from the first connector.

In a possible implementation, the third base plate is disposed on a surface that is of the protection plate and that is away from the backplane.

In a possible implementation, the protection plate is bonded to the third base plate, so that no additional connection component such as a screw, a buckle, or a rivet needs to be disposed between the protection plate and the third base plate. Therefore, on one hand, complexity of a connection structure between the protection plate and the third base plate is reduced, and assembling difficulty is reduced. On the other hand, a corresponding connection structure, such as a hole, does not need to be disposed on the protection plate and the third base plate, which reduces processing difficulty of the protection plate and the third base plate.

In a possible implementation, a material of the third base plate is an insulating material, so that the third base plate insulates and isolates the housing and the protection plate, thereby reducing a possibility that an electrical signal is transmitted between the housing and the protection plate by using the third base plate.

In a possible implementation, a quantity of protection plates is two. The two protection plates are separately connected to the two supporters. A gap is formed between the two protection plates. When the electronic device switches from the unfolded state to the folded state, because there is a gap between the two protection plates, there is no contact between the two protection plates, thereby reducing a possibility of an abnormal sound, noise, or abrasion of the two protection plates due to mutual impact or relative extrusion between the two protection plates.

In a possible implementation, a quantity of protection plates is one. The protection plate includes a bendable segment and a transfer segment. The bendable segment of the protection plate is disposed between the two transfer segments. The bendable segment of the protection plate is disposed corresponding to the bendable area of the backplane. The two transfer segments are separately connected to the two supporters. The first connector connects the backplane and the transfer segment. The first base plate is disposed between the backplane and the transfer segment. Because the protection plate is an integrated structure, in a process in which the electronic device switches from a folded state to an unfolded state, the protection plate cannot be easily inserted into a hole or a concave part on a housing, thereby reducing a possibility that the electronic device cannot continue to unfold because the protection plate is stuck during insertion of the protection plate into the housing and cannot be moved.

In a possible implementation, a plurality of through holes are disposed on the bendable segment, so as to reduce stiffness of the bendable segment, thereby facilitating bending deformation of the bendable segment when being subjected to a relatively small force.

In a possible implementation, an area that is of the housing and that faces the bendable area includes a hole and a concave part, and the protection plate covers the hole and the concave part. The protection plate can strengthen the protection capability of the bendable area on the backplane, effectively protect the bendable area, and reduce a possibility that the bendable area is subjected to impact to be deformed and damaged.

Figure 1:
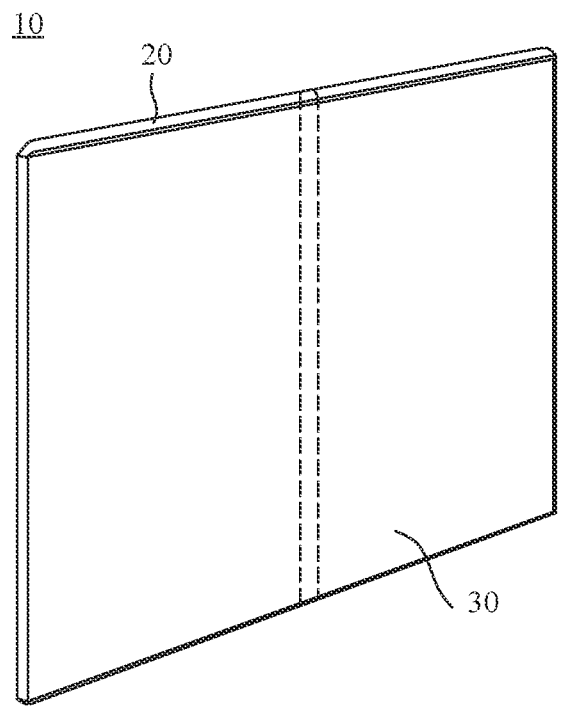
FIG. 1 is a schematic diagram of a structure of an electronic device according to this application.

Reference numerals: 10. Electronic device; 20. Housing; 20a. Hole; 20b. Concave part; 21. Supporter; 22. Rotating assembly; 22a. Rotating shaft; 30. Flexible display module; 31. Flexible display; 311. First display area; 312. Second display area; 313. Third display area; 32. Backplane; 32a. Hollowed-out hole; 321. Bendable area; 322. Support area; 40. Protection plate; 40a. Through hole; 40b. Concave surface; 40c. Convex surface; 40d. Through hole; 401. Bendable segment; 402. Transfer segment; 50. First connector; 60. First base plate; 70. Second connector; 80. Third connector; 80a. Avoidance hole; 90. Second base plate; 100. Third base plate; 110. Gap; 120. Avoidance space; 130. Concave groove; 140. Convex part; Y. Axial direction; Z. Thickness direction.

DESCRIPTION OF EMBODIMENTS

An electronic device in embodiments of this application may be a mobile terminal or a fixed terminal, such as a user equipment (UE) or a terminal. For example, the electronic device may be a portable Android® device (PAD), a personal digital assistant (PDA), a handheld device with a wireless communication function, a computing device, an in-vehicle device, a wearable device, a virtual reality (VR) terminal device, an augmented reality (AR) terminal device, a wireless terminal in industrial control, a wireless terminal in self driving, a wireless terminal in remote medical, a wireless terminal in a smart grid, a wireless terminal in transportation safety, a wireless terminal in a smart city, or a wireless terminal in a smart home. A form of the terminal device is not specifically limited in embodiments of this application.

In embodiments of this application, FIG. 1 schematically shows a structure of an electronic device 10 according to an embodiment. Referring to FIG. 1, an example in which the electronic device 10 is a handheld device with a wireless communication function is used for description. For example, the handheld device with a wireless communication function may be a mobile phone. For example, the mobile phone may be a foldable mobile phone including a flexible display.

Figure 2:
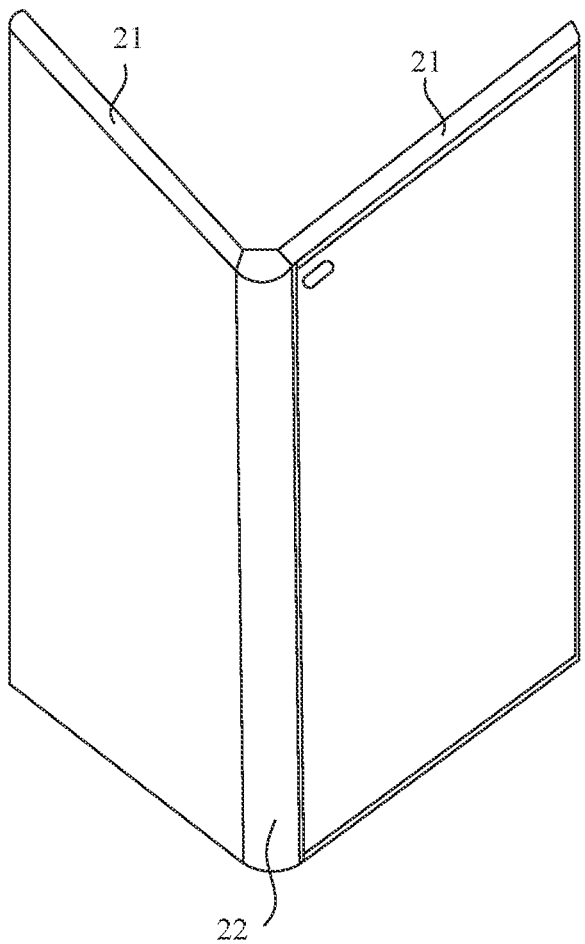
FIG. 2 is a schematic diagram of a structure of an electronic device in a semi-folded state according to this application.
Figure 3:
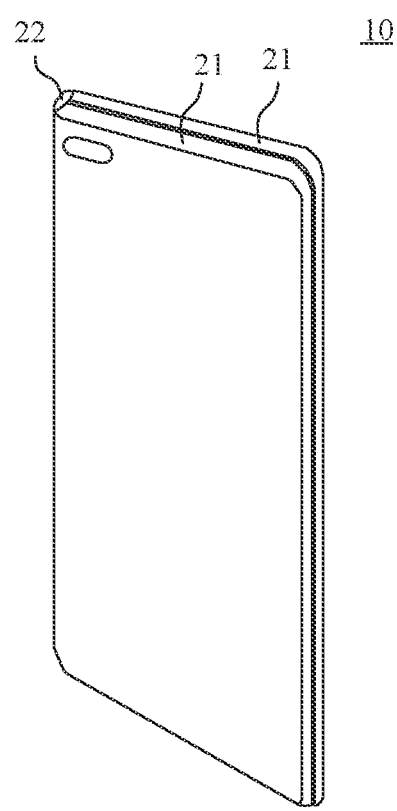
FIG. 3 is schematic diagram of a structure of an electronic device in a folded state according to this application.

FIG. 2 schematically shows a structure of the electronic device 10 in a semi-folded state. FIG. 3 schematically shows a structure of the electronic device 10 in a folded state. Referring to FIG. 2 and FIG. 3, the electronic device 10 includes a housing 20. The housing 20 includes at least two supporters 21 and a rotating assembly 22. The two supporters 21 are separately located on two sides of the rotating assembly 22. The rotating assembly 22 includes a rotating shaft. The two supporters 21 are separately rotatably connected to the rotating assembly 22. For example, the two supporters 21 may be separately connected to the rotating assembly 22 in a welding manner, a fastener locking manner, or the like. The two supporters 21 may rotate and fold relative to the rotating assembly 22. When the two supporters 21 are close to each other and are stacked on each other, the electronic device 10 is in the folded state. When the two supporters 21 are separated from each other from a stacked state and the two supporters 21 cannot rotate, the electronic device 10 is in an unfolded state. A process in which the two supporters 21 switch from the folded state to the unfolded state is an unfolding process, and a process in which the two supporters 21 switch from the unfolded state to the folded state is a folding process. For example, when the electronic device 10 is in a folded state, the two supporters 21 are stacked in a state of a two-layer structure. For example, the supporter 21 may include a middle frame or a rear cover.

Figure 4:
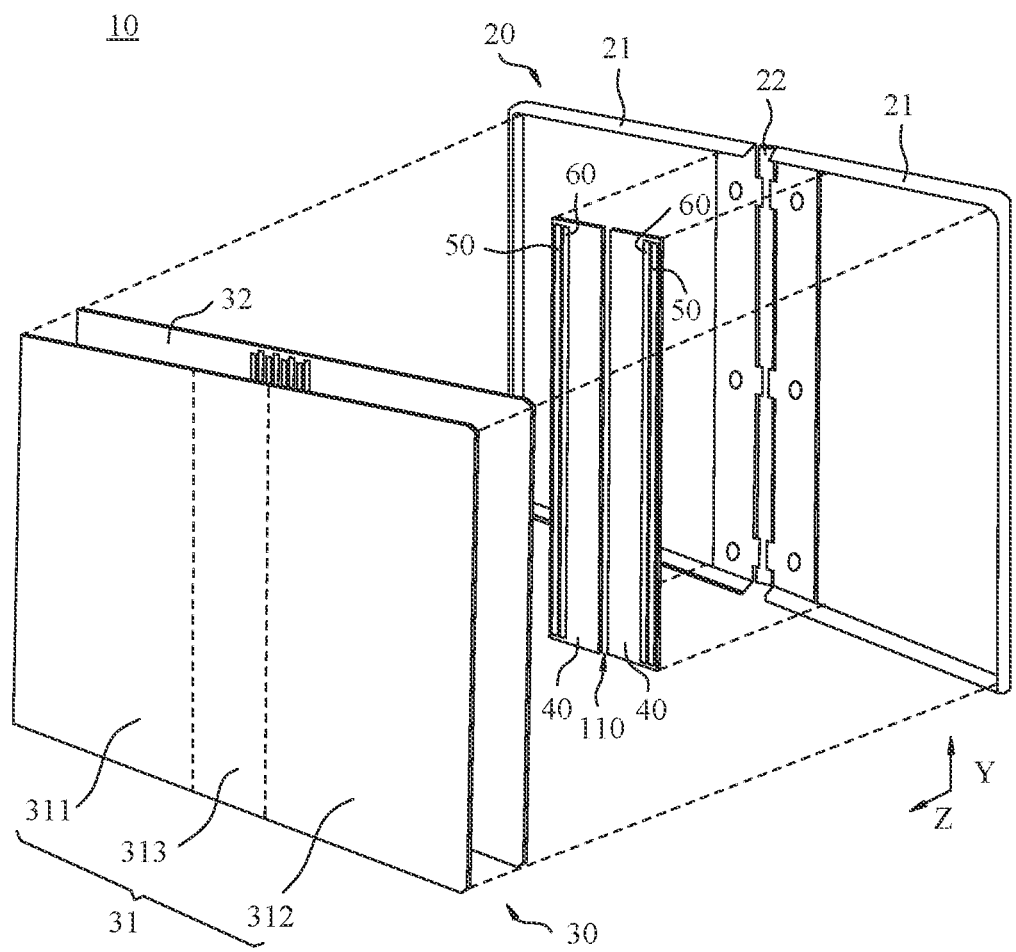
FIG. 4 is a schematic diagram of a partial decomposition structure of an electronic device according to an embodiment of this application.

FIG. 4 schematically shows a partial decomposition structure of an electronic device 10 according to an embodiment. Referring to FIG. 4, the electronic device 10 further includes a flexible display module 30. The flexible display module 30 is covered on a housing 20. The housing 20 may provide a mounting base for the flexible display module 30.

The flexible display module 30 includes a flexible display 31 and a backplane 32. The flexible display 31 includes a display area used to display image information. The flexible display 31 may include a touch function. The user may touch the display area of the flexible display 31 with a hand, to execute a corresponding operation instruction.

The flexible display 31 may include a first display area 311, a second display area 312, and a third display area 313. The first display area 311 may be disposed corresponding to one supporter 21. The second display area 312 may be disposed corresponding to the other supporter 21. The third display area 313 may be disposed corresponding to the rotating assembly 22. The flexible display 31 is bendable. When the two supporters 21 are in a folded state, the flexible display 31 is in a bent state. The first display area 311 and the second display area 312 of the flexible display 31 are close to each other, and the third display area 313 may be bent into an arc state. When the two supporters 21 are in an unfolded state, the flexible display 31 is in an unfolded state, and the first display area 311, the second display area 312, and the third display area 313 are in a flat state. Therefore, the electronic device 10 may change an overall size in a folded manner or an unfolded manner, and may also has a relatively large display area in an unfolded state.

Figure 5:
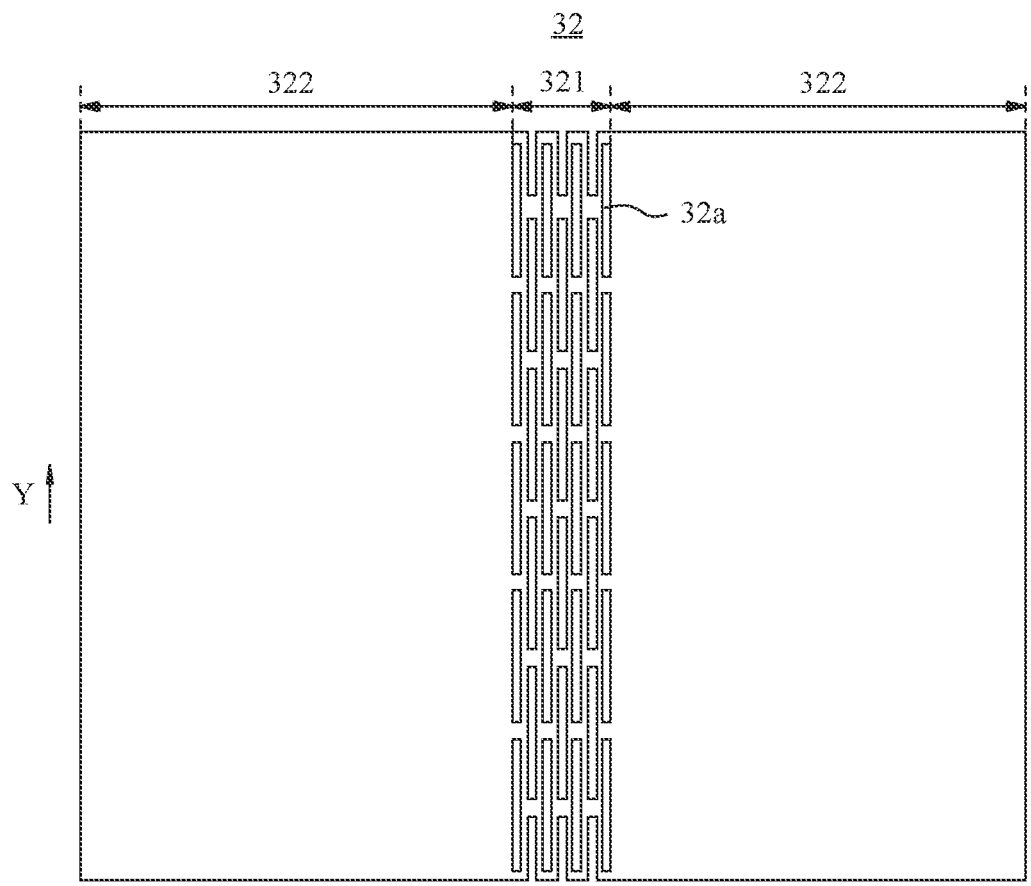
FIG. 5 is a schematic diagram of a structure of a backplane according to an embodiment of this application.

FIG. 5 schematically shows a structure of a backplane 32 according to an embodiment. Referring to FIG. 4 and FIG. 5, the backplane 32 includes a bendable area 321 and a support area 322. Two support areas 322 are separately located on two sides of the bendable area 321. The bendable area 321 is disposed facing the rotating assembly 22. Along a thickness direction Z of the electronic device 10, there is a spacing gap between the bendable area 321 and the housing 20, thereby reducing a possibility of position interference between the bendable area 321 and the housing 20. It should be noted that the thickness direction Z of the electronic device 10 refers to a stacking direction of the flexible display module 30 and the housing 20. The thickness direction Z of the electronic device 10 is perpendicular to an axial direction Y of a rotating shaft of the rotating assembly 22.

The backplane 32 is bendable in the bendable area 321. When the backplane 32 is in an unfolded state, the two support areas 322 and the bendable areas 321 are flush with each other. When the backplane 32 is in a folded state, the bendable area 321 is bent, and the two support areas 322 are close to each other and are stacked on each other. For example, the bendable area 321 can be in a circular arc shape after being bent.

The flexible display 31 is laid flat on a surface that is of the backplane 32 and that is away from the housing 20. The flexible display 31 and the backplane 32 may be synchronously folded or unfolded. The flexible display 31 may be connected to a surface of the backplane 32, for example, through bonding. The first display area 311 may be disposed corresponding to one support area 322. The second display area 312 may be disposed corresponding to the other support area 322. The third display area 313 may be disposed corresponding to the bendable area 321.

A material of the backplane 32 may be a metal material. For example, a material of the backplane 32 includes at least one of iron, titanium, nickel, and chromium elements. For example, a material of the backplane 32 may be, but is not limited to, steel, stainless steel, or titanium alloy. A shape of the backplane 32 in an unfolded state may be, but is not limited to, a rectangle or a square.

Along the thickness direction Z of the electronic device 10, each of the flexible display 31 and the backplane 32 has a relatively small thickness, so that an overall thickness of the assembled flexible display module 30 is relatively small. Therefore, the flexible display module 30 is sensitive to an action force in the thickness direction Z, that is, the flexible display module 30 can be easily deformed when being subjected to the action force in the thickness direction Z. For example, a value range of the thickness of the backplane 32 may be, but is not limited to, 0.1 mm to 0.2 mm.

The bendable area 321 of the backplane 32 is a stiffness weakening area. Stiffness of each of the two support areas 322 is higher than stiffness of the bendable area 321, so that when the two support areas 322 are subjected to a folding force, the backplane 32 may be relatively easily bent in the bendable area 321. In some examples, a plurality of hollowed-out holes 32a may be disposed on the bendable area 321, so as to reduce the stiffness of the bendable area 321, thereby facilitating bending deformation of the bendable area 321 when being subjected to a relatively small force. For example, the hollowed-out hole 32a is disposed penetrating through the backplane 32. In some other examples, thicknesses of the two support areas 322 are greater than the thickness of the bendable area 321, so as to reduce the stiffness of the bendable area 321, thereby facilitating bending deformation of the bendable area 321 when being subjected to a relatively small force.

Figure 6:
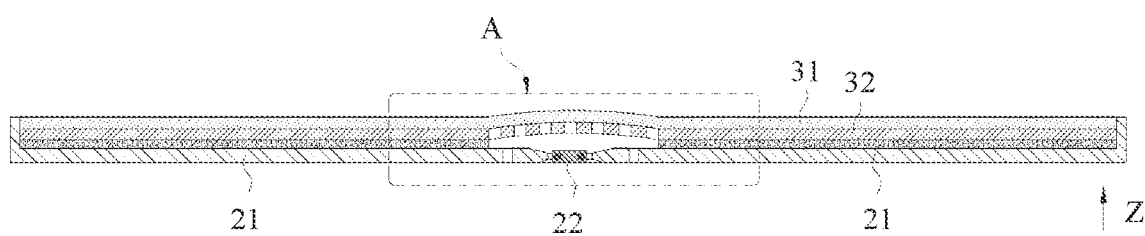
FIG. 6 is a schematic diagram of a partial cross-sectional structure of an electronic device in an unfolded state in a related technology.
Figure 7:
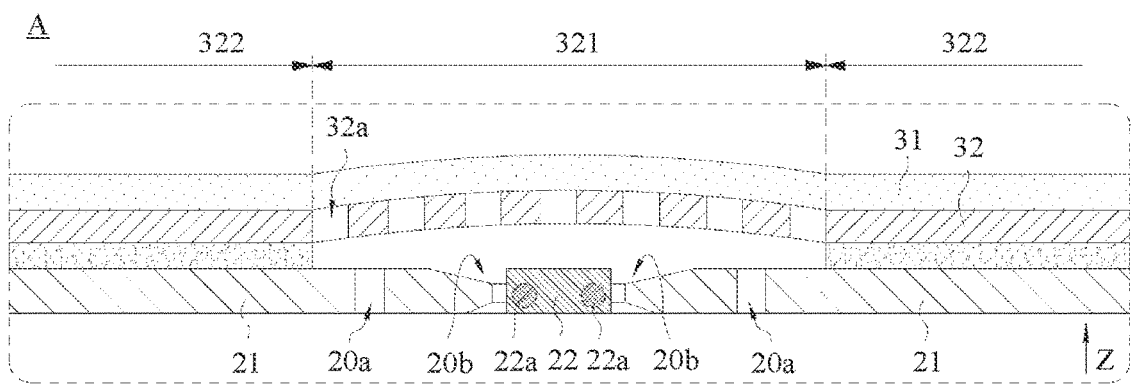
FIG. 7 is a schematic diagram after A in FIG. 6 is enlarged.

FIG. 6 schematically shows a partial cross-sectional structure of an electronic device 10 in a related technology. Referring to FIG. 6 and FIG. 7, an area that is on two support areas 322 of a backplane 32 and that is close to a bendable area 321 is connected to a housing 20. Therefore, the area is restricted, and can hardly move relative to the housing 20. Because stiffness of the bendable area 321 is relatively small and may be deformed due to internal stress, after the area that is of two support areas 322 and that is close to a bendable area 321, deformation of the bendable area 321 cannot be transmitted to the support area 322, so as to drive the support area 322 to move relative to the housing 20, so that the bendable area 321 has a bump relative to the support area 322, and a case of height difference mutation occurs between the bump and a surface of the support area 322. This deformation of the backplane 32 is transmitted to a corresponding area of a flexible display 31, which causes unevenness of the flexible display 31. Therefore, when the opened flexible display 31 is observed in a closed screen state, there is a problem of deformation of reflected light and shadow.

The electronic device 10 in this embodiment of this application can resolve a problem of deformation of reflected light and shadow on the flexible display 31 due to unevenness of the flexible display 31 in the bendable area 321, thereby improving use experience satisfaction of the flexible display 31 and the electronic device 10.

Figure 8:
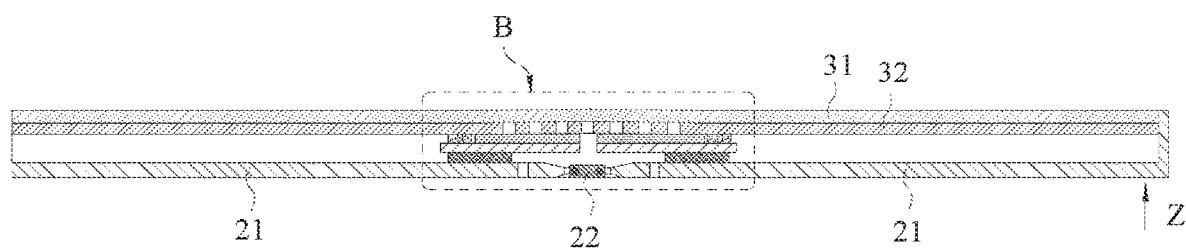
FIG. 8 is a schematic diagram of a partial cross-sectional structure of an electronic device in an unfolded state according to an embodiment of this application.
Figure 9:
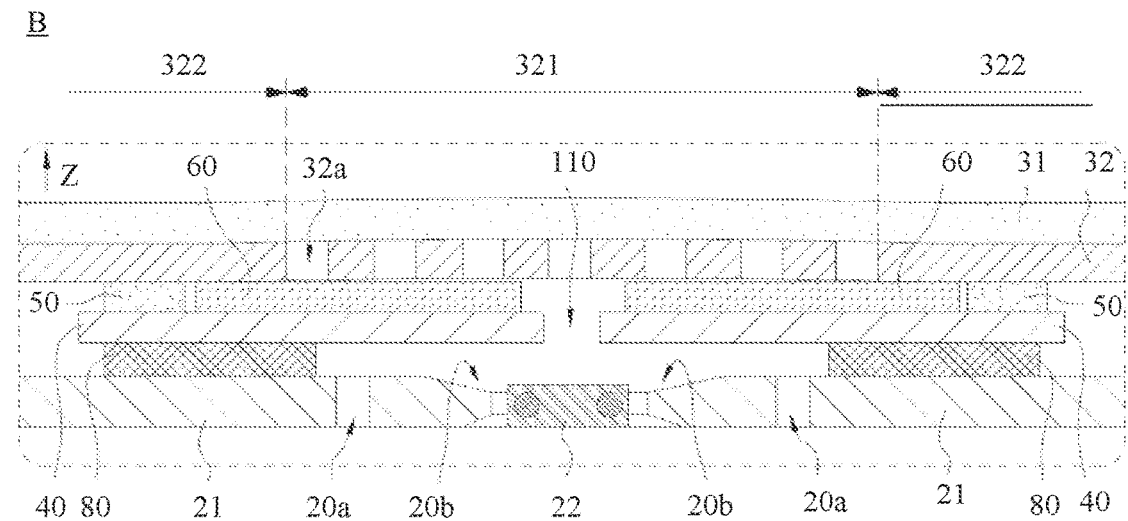
FIG. 9 is a schematic diagram after B in FIG. 8 is enlarged.

FIG. 8 schematically shows a partial cross-sectional structure of an electronic device 10 according to an embodiment. Referring to FIG. 8 and FIG. 9, the electronic device 10 in this embodiment of this application further includes a protection plate 40, a first connector 50, and a first base plate 60.

The protection plate 40 is disposed between a backplane 32 and a housing 20. The backplane 32 and the housing 20 are separately connected to the protection plate 40. For example, the protection plate 40 may be connected to a supporter 21 of the housing 20. Alternatively, the protection plate 40 may be connected to a rotating assembly 22 of the housing 20. A part of the protection plate 40 is located between a bendable area 321 of the backplane 32 and the housing 20, that is, a part of the protection plate 40 is located on an inner side of the bendable area 321 of the backplane 32. It should be noted that the fact that a part of the protection plate 40 is located on an inner side of the bendable area 321 of the backplane 32 means that an orthographic projection of the part of the protection plate 40 overlaps with an orthographic projection of the bendable area 321 along a thickness direction Z. A part of the protection plate 40 is located on an outer side of the bendable area 321, and there is a spacing between the part of the protection plate 40 and the bendable area 40. For example, a part of the protection plate 40 may be located between a support area 322 of the backplane 32 and the housing 20. The support area 322 of the backplane 32 may be connected to the protection plate 40. It should be noted that the fact that a part of the protection plate 40 is located on an outer side of the bendable area 321 means that an orthographic projection of the part of the protection plate 40 does not overlap with an orthographic projection of the bendable area 321 along a thickness direction Z.

It should be noted that the outer side of the bendable area 321 refers to an area that is outside the orthographic projection of the bendable area 321 along the thickness direction Z. The inner side of the bendable area 321 refers to an area that is located within the orthographic projection of the bendable area 321 along the thickness direction Z. A boundary line between the outer side and the inner side of the bendable area 321 is an edge line of the bendable area 321 along the thickness direction Z.

Because stiffness of the bendable area 321 of the backplane 32 is relatively small, an impact resistance capability of the bendable area 321 is weaker than that of the support area 322. Therefore, when being subjected to a force along the thickness direction Z, the bendable area 321 may be relatively easily deformed or damaged. In addition, an area that is of the housing 20 and that faces the bendable area 321 includes a hole 20a or a concave part 20b. For example, the hole 20a needs to be reserved at a position in which the supporter 21 is connected to the rotating assembly 22. Alternatively, there is a height difference between the supporter 21 and the rotating assembly 22 to form a concave part 20b. Alternatively, there is a height difference between structures of the rotating assembly 22 to form a concave part 20b. In a dimension of the entire electronic device 10, an area that includes a hole 20a or a concave part 20b has a relatively weak impact resistance capability, and consequently, a protection capability below the bendable area 321 is weak, and there is a possibility that the bendable area 321 is subjected to impact to be deformed and damaged. The protection plate 40 disposed in this application may cover the hole 20a or the concave part 20b, so as to strengthen the protection capability of the bendable area 321, thereby forming effective protection against the bendable area 321, and reducing a possibility that the bendable area 321 is subjected to impact to be deformed and damaged.

A material of the protection plate 40 may be a metal material. For example, a material of the protection plate 40 includes at least one of iron, titanium, nickel, and chromium elements. For example, a material of the protection plate 40 may be, but is not limited to, steel, stainless steel, or titanium alloy. For example, a material of the backplane 32 may be the same as a material of the protection plate 40.

The first connector 50 connects the backplane 32 and the protection plate 40. The backplane 32 is connected to the protection plate 40 by using the first connector 50. After the first connector 50 connects the backplane 32 and the protection plate 40, the first connector 50 exerts a binding force on the backplane 32 and the protection plate 40, so that at the first connector 50, the backplane 32 cannot easily move relative to the protection plate 40. For example, when the backplane 32 is subjected to a force along the thickness direction Z, an area that is of the backplane 32 and that is at the first connector 50 cannot easily move away from the protection plate 40. For example, the first connector 50 connects the support area 322 of the backplane 32 and the protection plate 40.

The first connector 50 is disposed on the outer side of the bendable area 321, so that an orthographic projection of the first connector 50 does not overlap with an orthographic projection of the bendable area 321 along a thickness direction Z. There is a predetermined spacing between the first connector 50 and the bendable area 321. Therefore, the first connector 50 is relatively far from the bendable area 321, so that a part that is of the support area 322 of the backplane 32 and that goes beyond the first connector 50 is located between the first connector 50 and the bendable area 321.

The first base plate 60 is disposed between the backplane 32 and the protection plate 40, so that the first base plate 60 may fill space between the backplane 32 and the protection plate 40. The first base plate 60 is located on one side that is of the first connector 50 and that faces the bendable area 321. One of the backplane 32 and the protection plate 40 is connected to the first base plate 60, so that the first base plate 60 is fastened to one of the backplane 32 and the protection plate 40, and the other of the backplane 32 and the protection plate 40 is not connected to the first base plate 60, that is, the other of the backplane 32 and the protection plate 40 and the first base plate 60 may come into contact with each other or be freely separated from each other.

For example, when the electronic device 10 is in an unfolded state, the backplane 32, the first base plate 60, and the protection plate 40 may come into contact with each other, so that the first base plate 60 may support the backplane 32, thereby reducing a possibility that the backplane 32 is dented toward the housing 20 because of suspension of the backplane 32 in an area of the first base plate 60. When the electronic device 10 switches from the unfolded state to the folded state, at the first base plate 60, a spacing between the backplane 32 and the protection plate 40 may be increased, so that one of the backplane 32 and the protection plate 40 is separated from the first base plate 60, and no tension stress is generated on the first base plate 60 when the backplane 32 and the protection plate 40 are separated. Therefore, when the backplane 32 moves away from the protection plate 40, the backplane 32 and the protection plate 40 do not exert a tension stress on the first base plate 60, thereby reducing a possibility that the electronic device 10 generates an abnormal sound or deformation of the backplane 32 because the first base plate 60 bears a relatively large tension stress and is peeled off from one of the backplane 32 and the protection plate 40.

At least a part of the first base plate 60 is located on the outer side of the bendable area 321 of the backplane 32, so that an orthographic projection of the part of the first base plate 60 on the outer side of the bendable area 321 does not overlap with an orthographic projection of the bendable area 321 along the thickness direction Z. A part that is of the first base plate 60 and that is located on the outer side of the bendable area 321 of the backplane 32 is disposed between the first connector 50 and the bendable area 321. For example, a part that is of the first base plate 60 and that is located on the outer side of the bendable area 321 is located below the support area 322 of the backplane 32, so that a part that is of the support area 322 and that goes beyond the first connector 50 can be supported.

The part that is of the support area 322 of the backplane 32 and that goes beyond the first connector 50 is not limited or restricted by the first base plate 60 and the protection plate 40, so that the backplane 32 may move relative to the protection plate 40 when being subjected to an action force along the thickness direction Z, for example, may move away from the protection plate 40 to cause the warping deformation. Therefore, when the bendable area 321 of the backplane 32 generates a bump and deformation, under the action of internal stress, due to stress concentration, deformation of the bendable area 321 may be transmitted to an area that is of the support area 322 and that is close to the bendable area 321, so as to drive the area that is of the support area 322 and that is close to the bendable area 321 to move away from the protection plate 40 to cause the warping deformation. Therefore, a relatively gentle and smooth transition can be implemented between the support area 322 and the bendable area 321, stress of the bendable area 321 is released, and a degree of deformation of the bendable area 321 can be reduced, so that an abrupt height difference change occurs between surfaces that are of the bendable area 321 and the support area 322, thereby causing a possibility of unevenness of the flexible display 31, and reducing a possibility of deformation of reflected light and shadow on the flexible display 31.

In some implementations, the protection plate 40 is connected to the first base plate 60, that is, the protection plate 40 cannot be easily separated from the first base plate 60, and the backplane 32 is not connected to the first base plate 60, that is, the backplane 32 may be freely separated from the first base plate 60. It should be noted that free separation means that when the backplane 32 is separated from the first base plate 60, the backplane 32 does not exert a tension stress on the first base plate 60. The first base plate 60 has a predetermined thickness, so the first base plate 60 has specific stiffness. If the first base plate 60 is disposed on the backplane 32, because the backplane 32 has a relatively small thickness, the disposed first base plate 60 has a possibility of strengthening stiffness of a corresponding area on the backplane 32, so that a deformation capability of the backplane 32 corresponding to the area of the first base plate 60 is weaker than a deformation capability of another area, and therefore there is a possibility of inconsistent deformation of the backplane 32, which affects a display effect of the flexible display 31. In this embodiment, a manner in which the first base plate 60 is fastened to the protection plate 40 may avoid the foregoing case.

The backplane 32 and the first base plate 60 may come into contact with each other or be freely separated from each other. Referring to FIG. 9, when the electronic device 10 is in an unfolded state, the backplane 32 and the first base plate 60 are in a contact state, so that the first base plate 60 may form a support for the backplane 32.

Figure 10:
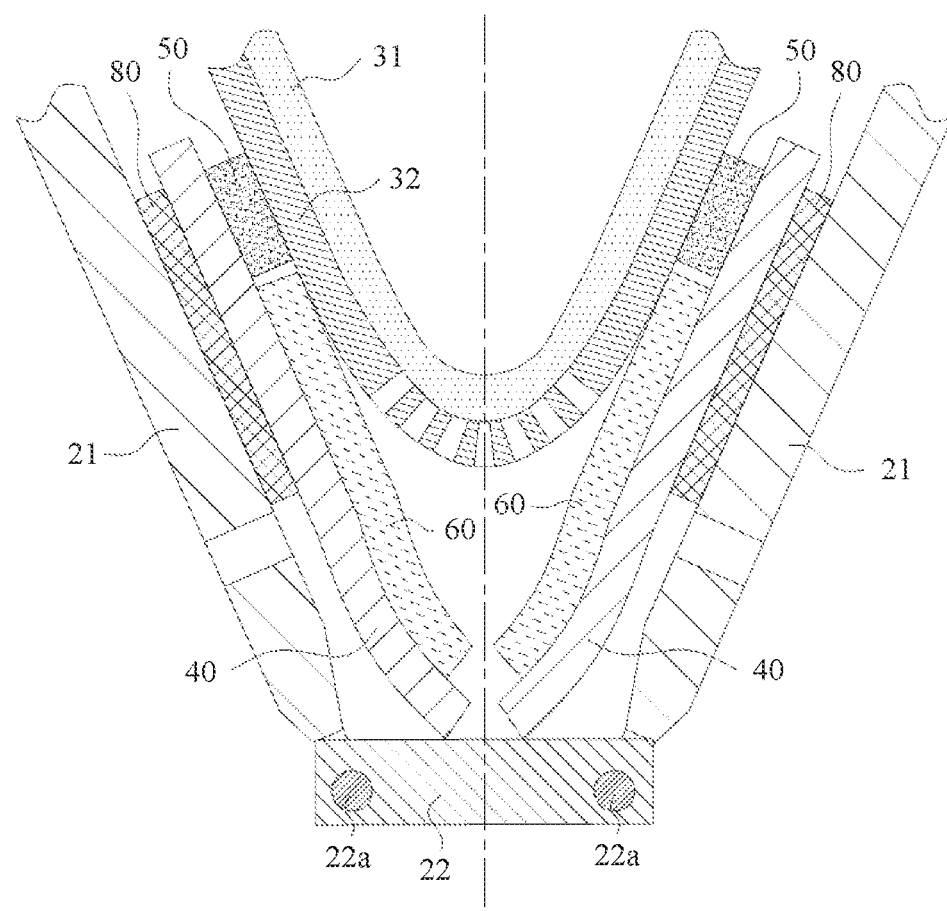
FIG. 10 is a schematic diagram of a partial cross-sectional structure of an electronic device in a semi-folded state according to an embodiment of this application.

FIG. 10 schematically shows a partial cross-sectional structure of an electronic device 10 in a semi-folded state according to an embodiment. Referring to FIG. 10, when the electronic device 10 switches from an unfolded state to a folded state, in a position of a first base plate 60, a spacing between a backplane 32 and a protection plate 40 may be increased, so that the backplane 32 may be partially or completely separated from the first base plate 60. When the backplane 32 is separated from the first base plate 60, the backplane 32 does not generate a tension stress on the first base plate 60.

In some examples, a first connector 50 may be disposed in an edge area of the protection plate 40. The first base plate 60 and the first connector 50 may come into contact with each other. At least a part of a surface that is of the first base plate 60 and that faces the first connector 50 comes into contact with the first connector 50. Therefore, a surface that is of the first connector 50 and that faces the first base plate 60 is used as a reference, and then the first base plate 60 is disposed on the protection plate 40, which can improve position assembly precision of the first base plate 60.

In some other examples, a spacing may be reserved between the first base plate 60 and the first connector 50, so that a buffer space is formed between the first base plate 60 and the first connector 50. When at least one of the first base plate 60 and the first connector 50 expands toward each other, a possibility of mutual extrusion between the first base plate 60 and the first connector 50 may be reduced.

In some implementations, the protection plate 40 is bonded to the first base plate 60, so that no additional connection component such as a screw, a buckle, or a rivet needs to be disposed between the protection plate 40 and the first base plate 60. Therefore, on one hand, complexity of a connection structure between the protection plate 40 and the first base plate 60 is reduced, and assembling difficulty is reduced. On the other hand, a corresponding connection structure, such as a hole, does not need to be disposed on the protection plate 40 and the first base plate 60, which reduces processing difficulty of the protection plate 40 and the first base plate 60. In some examples, glue is applied to a predetermined position of at least one of the protection plate 40 and the first base plate 60, and then the protection plate 40 is bonded to the first base plate 60. After the glue is cured, the first base plate 60 and the protection plate 40 are firmly connected, and the two cannot be easily separated. In some other examples, the first base plate 60 includes a sticky surface. The first base plate 60 may be directly stuck to a surface that is of the protection plate 40 and that faces the backplane 32. In this embodiment, when the backplane 32 is separated from the first base plate 60, the backplane 32 does not generate the tension stress on the first base plate 60, so that a bonding layer between the first base plate 60 and the protection plate 40 does not peel off from the protection plate 40 and generate an abnormal sound.

In some implementations, a material of the first base plate 60 is an insulating material, so that the first base plate 60 insulates and isolates a flexible display module 30 and the protection plate 40, thereby reducing a possibility that an electrical signal is transmitted between the protection plate 40 and the flexible display module 30 by using the first base plate 60. The first base plate 60 has good flexibility. When the backplane 32 and the first base plate 60 are switched between a contact state and a separation state, the backplane 32 and the first base plate 60 cannot easily generate noise due to mutual impact or friction between the two. This improves mute degree in a switching process of the electronic device 10 between the unfolded state and the folded state, and also reduces a possibility that the backplane 32 is scratched by the first base plate 60 and scratches occur. In some examples, the first base plate 60 may be a plastic diaphragm or a plastic film. For example, a material of the first base plate 60 may include, but is not limited to, polyvinyl chloride, polyethylene, polypropylene, or polystyrene.

Figure 11:
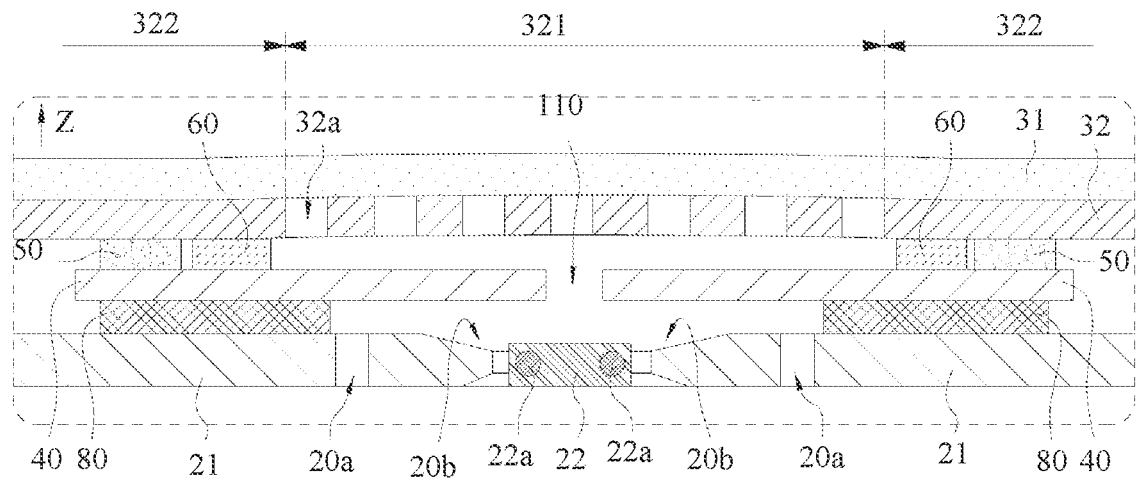
FIG. 11 is a schematic diagram of a partial cross-sectional structure of an electronic device according to another embodiment of this application.

In some implementations, FIG. 11 schematically shows a partial cross-sectional structure of an electronic device 10. Referring to FIG. 11, a first base plate 60 is wholly located on an outer side of a bendable area 321 of a backplane 32, so that an orthographic projection of the first base plate 60 does not overlap with an orthographic projection of the bendable area 321 along a thickness direction Z. The first base plate 60 is disposed between a first connector 50 and the bendable area 321. Because a spacing between the bendable area 321 and a protection plate 40 is relatively small, and a thickness error exists between the backplane 32, the first base plate 60, and the protection plate 40 in a processing and manufacturing process, when the thickness of the first base plate 60 is greater than a spacing between the bendable area 321 and the protection plate 40, the first base plate 60 exerts a jacking force on the bendable area 321, so that the bendable area 321 generates a bump. In this embodiment, a manner in which the first base plate 60 is wholly located on the outer side of the bendable area 321 can reduce a processing precision requirement of the backplane 32, the first base plate 60, and the protection plate 40, and avoid a case in which the first base plate 60 jacks up the bendable area 321.

In some examples, a value range of a spacing between the first connector 50 and the bendable area 321 of the backplane 32 may be, but is not limited to, 3 mm to 4 mm. A side face that is of the first base plate 60 and that is away from the first connector 50 may be flush with an edge of the bendable area 321 in the thickness direction Z. Alternatively, a spacing between the side face that is of the first base plate 60 and that is away from the first connector 50 and the edge of the bendable area 321 is reserved. For example, a value range of the reserved spacing may be, but is not limited to, 0.2 mm to 1 mm.

In some implementations, the first connector 50 is a bonding member, so that no additional connection component such as a screw, a buckle, or a rivet needs to be disposed between the protection plate 40 and the backplane 32. Therefore, on one hand, complexity of a connection structure between the protection plate 40 and the backplane 32 is reduced, and assembling difficulty is reduced. On the other hand, a corresponding connection structure, such as a hole, does not need to be disposed on the protection plate 40 and the backplane 32, which reduces processing difficulty of the protection plate 40 and the backplane 32, and improves structural integrity of the protection plate 40 and backplane 32. In some examples, the first connector 50 may be a double faced adhesive tape. Alternatively, glue is applied to a predetermined position of at least one of the protection plate 40 and the backplane 32, and the protection plate 40 and the backplane 32 are bonded to each other. After the glue is cured, a first connector 50 is formed. In some examples, the first connector 50 is an insulating member, so that the first connector 50 insulates and isolates the backplane 32 and the protection plate 40, thereby reducing a possibility that an electrical signal is transmitted between the backplane 32 and the protection plate 40 by using the first connector 50.

In some implementations, a maximum thickness of the first connector 50 is equal to a maximum thickness of the first base plate 60, so that a surface that is of the first connector 50 and that faces the backplane 32 may be flush with a surface that is of the first base plate 60 and that faces the backplane 32. Therefore, when both the first connector 50 and the first base plate 60 come into contact with the backplane 32, any one of the first connector 50 and the first base plate 60 does not exert a jacking force on the backplane 32 to cause the backplane 32 to generate a bump and deformation. For example, the surface that is of the first connector 50 and that faces the backplane 32 is a plane. The surface that is of the first base plate 60 and that faces the backplane 32 is a plane. For example, the first connector 50 and the first base plate 60 each are a structural member with an even thickness.

Figure 12:
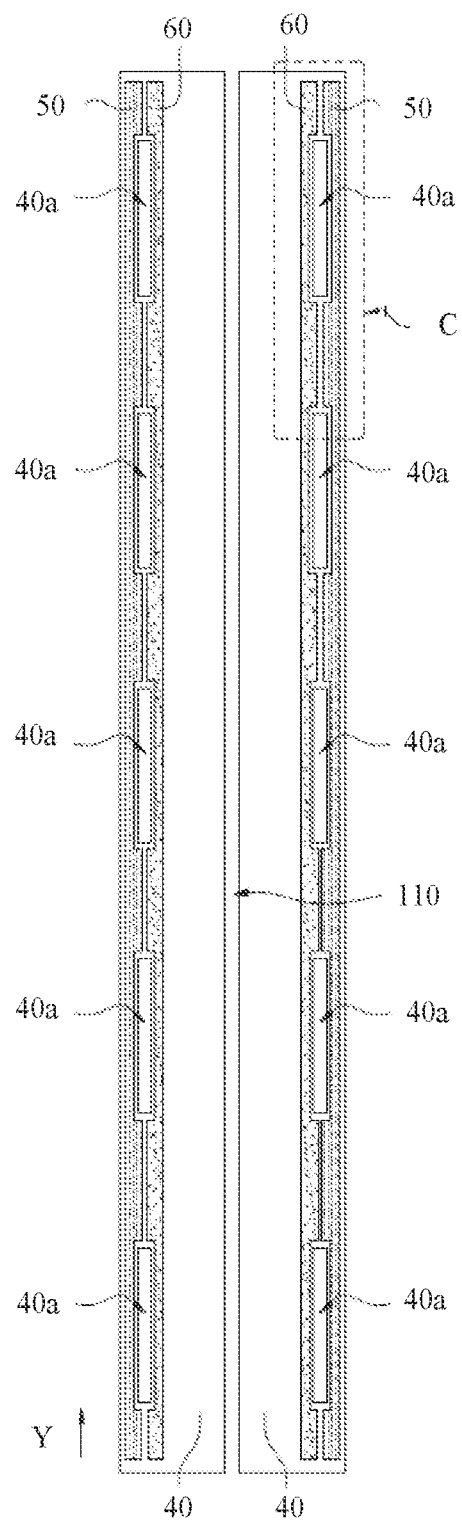
FIG. 12 is a schematic diagram of a structure of a connection state of a protection plate, a first connector, and a first base plate according to an embodiment of this application.

In some implementations, FIG. 12 schematically shows a structure of a connection state of a protection plate 40, a first connector 50, and a first base plate 60 according to an embodiment. Referring to FIG. 12, the protection plate 40 includes a through hole 40a. The through hole 40a is located on an outer side of a bendable area 321 of a backplane 32. Along a thickness direction Z of the electronic device 10, the through hole 40a penetrates through two surfaces of the protection plate 40. The electronic device 10 further includes a second connector 70. The second connector 70 passes through the through hole 40a and connects the backplane 32 and a housing 20. One end of the second connector 70 is directly connected to the backplane 32, and the other end is directly connected to the housing 20. The first connector 50 and the first base plate 60 are disposed around the second connector 70, that is, the first connector 50 and the first base plate 60 are disposed along a circumferential direction of the second connector 70. The backplane 32 is connected to the housing 20 by using the first connector 50 and the protection plate 40, and is connected to the housing 20 by using the second connector 70, thereby improving stability of a connection between the backplane 32 and the housing 20.

In some examples, the second connector 70 is a bonding member, so that no additional connection component such as a screw, a buckle, or a rivet needs to be disposed between the housing 20 and the backplane 32. Therefore, on one hand, complexity of a connection structure between the housing 20 and the backplane 32 is reduced, and assembling difficulty is reduced. On the other hand, a corresponding connection structure, such as a hole, does not need to be disposed on the housing 20 and the backplane 32, which reduces processing difficulty of the housing 20 and the backplane 32, and improves structural integrity of the housing 20 and the backplane 32.

For example, glue is then injected into a position of the through hole 40a in a glue dispensing manner, and the backplane 32 is covered and disposed on the first connector 50 and the first base plate 60. After the glue is cured, a second connector 70 is formed, so that both the first connector 50 and the second connector 70 are connected to the backplane 32.

For example, a maximum thickness of the first connector 50 is equal to a maximum thickness of the first base plate 60, so that in a process of injecting the glue and when the backplane 32 is covered and disposed on the first connector 50 and the first base plate 60, the glue is blocked by the first connector 50 and the first base plate 60 along a radial direction of the through hole 40a, and does not flow between the backplane 32 and the first base plate 60, thereby reducing a possibility that the backplane 32 is bonded to the first base plate 60, or does not flow to outer side areas of the first connector 50 and the first base plate 60, thereby reducing a possibility that the backplane 32 is unnecessarily connected to another structure by using overflow glue.

Figure 13:
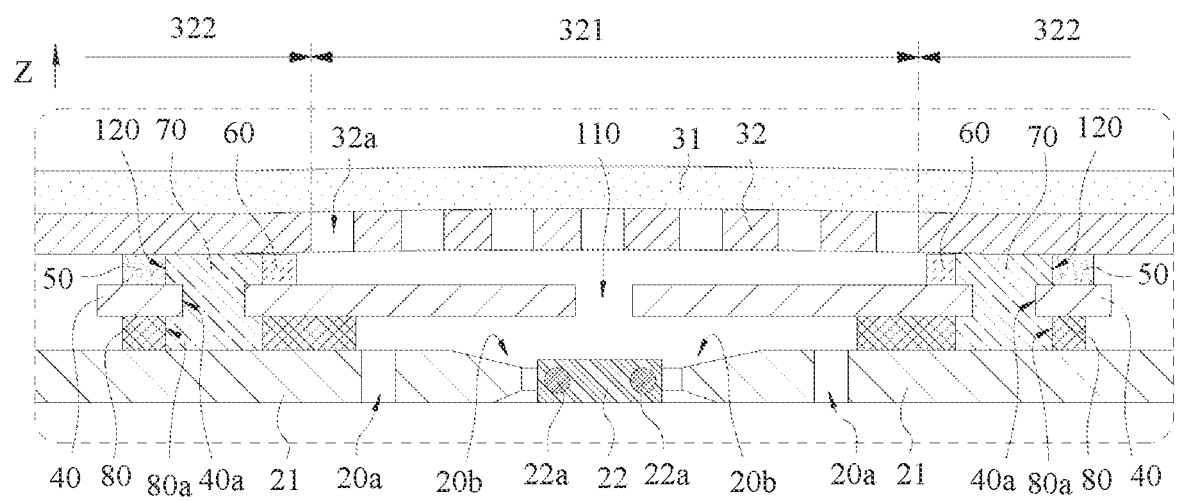
FIG. 13 is a schematic diagram of a partial cross-sectional structure of an electronic device according to still another embodiment of this application.

FIG. 13 schematically shows a partial cross-sectional structure of an electronic device 10 according to an embodiment. Referring to FIG. 13, a first connector 50 and a first base plate 60 are disposed avoiding a through hole 40a of a protection plate 40. An avoidance space 120 is formed between the first connector 50 and the first base plate 60, so that neither the first connector 50 nor the first base plate 60 shields the through hole 40a, so as to avoid that in an axial direction of the through hole 40a, the first connector 50 and the first base plate 60 form a barrier against glue, and then the glue cannot be easily injected into the through hole 40a. An axial direction of the through hole 40a is the same as a thickness direction Z.

In some examples, the first connector 50 is connected to a second connector 70, so that the first connector 50 and the second connector 70 may form an integrated structure, which improves stability of a connection structure of a backplane 32, the first connector 50, the second connector 70, and the protection plate 40, and also reduces a possibility that the first connector 50 is separated from the backplane 32 or the first connector 50 is separated from the protection plate 40.

In some examples, the first base plate 60 is connected to the second connector 70, so that the first base plate 60 and the second connector 70 may form an integrated structure, which improves stability of a connection structure of the first base plate 60, the second connector 70, and the protection plate 40, and also reduces a possibility that the first base plate 60 is separated from the protection plate 40.

It can be understood that both the first connector 50 and the first base plate 60 are connected to the second connector 70.

In some examples, there is a spacing between a wall surface that is of the first connector 50 and that faces the through hole 40a and an edge of the through hole 40a, so that a step structure is formed between the first connector 50 and the protection plate 40. The first connector 50 does not cover an area that is of the protection plate 40 and that is close to the through hole 40a, so that the area is exposed. When the glue is injected into a position of the through hole 40a, a part of the glue flows to an area exposed by the protection plate 40, and a part of the second connector 70 formed after the glue is cured is located between the protection plate 40 and the backplane 32. In some other examples, there is a spacing between a wall surface that is of the first base plate 60 and that faces the through hole 40a and the edge of the through hole 40a, so that a step structure is formed between the first base plate 60 and the protection plate 40. The first base plate 60 does not cover an area that is of the protection plate 40 and that is close to the through hole 40a, so that the area is exposed. When the glue is injected into a position of the through hole 40a, a part of the glue flows to an area exposed by the protection plate 40, and a part of the second connector 70 formed after the glue is cured is located between the protection plate 40 and the backplane 32. Therefore, the second connector 70 may be limited or restricted by the protection plate 40, so that the second connector 70 cannot easily fall out of the through hole 40a and be separated from the protection plate 40.

It can be understood that there is a spacing between the wall surface that is of the first connector 50 and that faces the through hole 40a and the edge of the through hole 40a, and there is a spacing between the wall surface that is of the first base plate 60 and that faces the through hole 40a and the edge of the through hole 40a. For example, the avoidance space 120 formed after the first connector 50 and the first base plate 60 are enclosed has a same shape as the through hole 40a, and a size of the avoidance space 120 is greater than a size of the through hole 40a.

Figure 14:
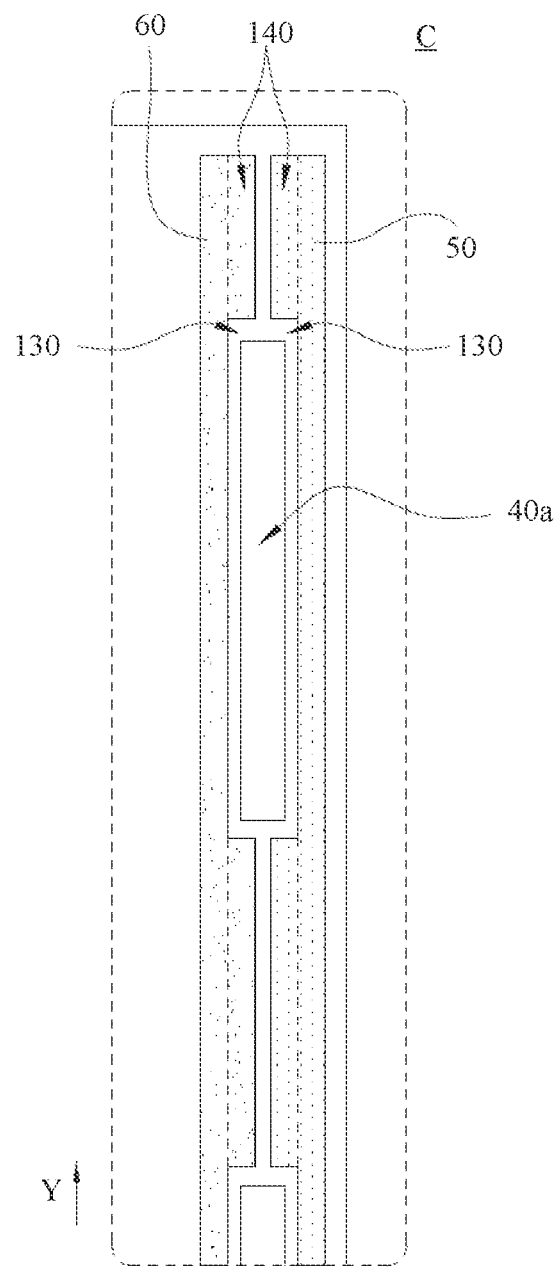
FIG. 14 is a schematic diagram after C in FIG. 12 is enlarged.

In some examples, as shown in FIG. 14, both the first connector 50 and the first base plate 60 are in a shape of comb teeth with a concave groove 130 and a convex part 140. In an area between two adjacent through holes 40a, one part is covered by the convex part 140 of the first connector 50, and the other part is covered by the convex part 140 of the first base plate 60. A concave groove 130 of the first connector 50 and a concave groove 130 of the first base plate 60 jointly form an avoidance space 120.

In some examples, the through hole 40a may be, but is not limited to, a strip-shaped hole extending along the axial Y of the rotating shaft 22a in the rotating assembly 22. A quantity of through holes 40a may be one or more than two.

In some examples, more than two through holes 40a are spaced along the axial direction Y of the rotating shaft 22a in the rotating assembly 22. When glue is injected into a position of the through hole 40a by using a glue dispensing device, to avoid overflow of the glue, the glue dispensing device control an amount of glue dispensed each time. For example, the amount of glue dispensed is controlled from 0.4 g to 0.6 g each time, for example, the amount of glue dispensed is controlled at 0.5 g each time. A plurality of through holes 40a are disposed on the protection plate 40, so that a size of each through hole 40a can be designed to be relative small. Therefore, the amount of glue dispensed at a time can fill the through hole 40a after free flow. A glue dispensing device controls the amount of glue dispensed at a time, so that after glue dispensing is performed on each through hole 40a, it can be ensured that the through hole 40a is filled with sufficient glue, and a case in which the glue is not controlled accurately because a size of the through hole 40a is excessively large can be avoided, thereby improving glue dispensing efficiency, and reducing a possibility that the through hole 40a is filled with insufficient glue or the glue overflows after the through hole 40a is filled with excessive glue. In addition, a manner in which a plurality of through holes 40a are disposed on the protection plate 40 may avoid a case in which the overall stiffness of the protection plate 40 is low due to large sizes of the through holes 40a.

In some implementations, referring to FIG. 13, the electronic device 10 further includes a third connector 80. The third connector 80 is disposed between the protection plate 40 and the housing 20. The third connector 80 connects the protection plate 40 and the housing 20, so that the protection plate 40 cannot easily move, and then relative positions of the protection plate 40 and the housing 20 cannot easily change. For example, the third connector 80 connects the protection plate 40 and the supporter 21 of the housing 20. For example, a part of the third connector 80 is located below the first connector 50 and the first base plate 60. A part that is of the third connector 80 that goes beyond the first base plate 60 may extend below the bendable area 321. When the electronic device 10 is in an unfolded state, there is a spacing between a part of the protection plate 40 that is located on one side of the third connector 80 and that faces the bendable area 321 and the housing 20.

In some examples, along a thickness direction Z, an orthographic projection area of the first connector 50 on the protection plate 40 is smaller than an orthographic projection area of the third connector 80 on the protection plate 40, and therefore a connection area between the protection plate 40 and the housing 20 is larger than a connection area between the protection plate 40 and the backplane 32, so that a connection strength between the protection plate 40 and the housing 20 is relatively high, and the two cannot be easily separated.

In some examples, referring to FIG. 11, the first connector 50 and the first base plate 60 are disposed side by side, and the third connector 80 is an integrated structure without openings. In some other examples, as shown in FIG. 13, a through hole 40*a* is disposed on the protection plate 40, and the first connector 50 and the first base plate 60 form an avoidance space 120 for avoiding the through hole 40*a*. The third connector 80 includes an avoidance hole 80*a* that is used to avoid the through hole 40*a*. The through hole 40*a* of the protection plate 40 is connected to the avoidance hole 80*a* of the third connector 80. When glue is injected into a position of the through hole 40*a* to form the second connector 70, the second connector 70 may fill the through hole 40*a*, the avoidance space 120, and the avoidance hole 80*a*.

For example, a size of the avoidance hole 80*a* is greater than a size of the through hole 40*a*, so that there is a spacing between a wall surface that is of the avoidance hole 80*a* and that faces the through hole 40*a* and an edge of the through hole 40*a*, and then a step structure is formed between the third connector 80 and the protection plate 40. The third connector 80 does not cover an area that is of the protection plate 40 and that is close to the through hole 40*a*, so that the area is exposed. When the glue is injected into a position of the through hole 40*a*, a part of the glue flows to an area exposed by the protection plate 40, and a part of the second connector 70 formed after the glue is cured is located between the protection plate 40 and the housing 20. Therefore, the second connector 70 may be limited or restricted by the protection plate 40, so that the second connector 70 cannot easily fall out of the through hole 40*a* and be separated from the protection plate 40.

For example, a shape of the through hole 40*a* is the same as a shape of the avoidance hole 80*a*.

In some examples, the third connector 80 is a bonding member, so that no additional connection component such as a screw, a buckle, or a rivet needs to be disposed between the protection plate 40 and the housing 20. Therefore, on one hand, complexity of a connection structure between the protection plate 40 and the housing 20 is reduced, and assembling difficulty is reduced. On the other hand, a corresponding connection structure, such as a hole, does not need to be disposed on the protection plate 40 and the housing 20, which reduces processing difficulty of the protection plate 40 and the housing 20, and improves structural integrity of the protection plate 40 and the housing 20. In some examples, the third connector 80 may be a double faced adhesive tape. Alternatively, glue may be applied to a predetermined position of at least one of the protection plate 40 and the housing 20, and the protection plate 40 and the housing 20 are bonded to each other. After the glue is cured, a third connector 80 is formed. In some examples, the third connector 80 is an insulation member. The third connector 80 insulates and isolates the protection plate 40 and the housing 20, thereby reducing a possibility that an electrical signal is transmitted between the protection plate 40 and the housing 20 by using the third connector 80.

Figure 15:
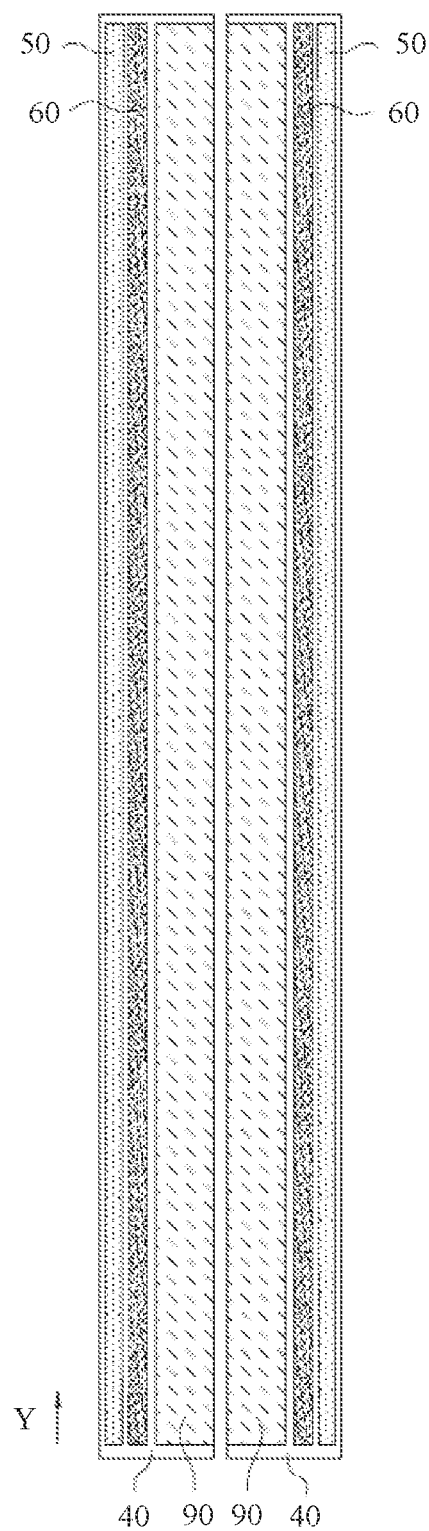
FIG. 15 is a schematic diagram of a structure of a connection state of a protection plate, a first connector, a first base plate, and a second base plate according to an embodiment of this application.
Figure 16:
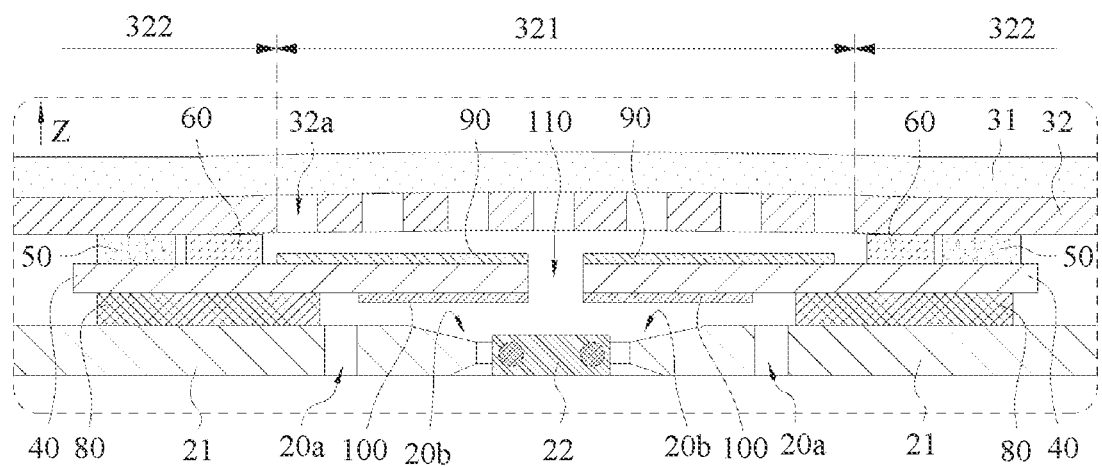
FIG. 16 is a schematic diagram of a partial cross-sectional structure of an electronic device according to still another embodiment of this application.

In some implementations, FIG. 15 schematically shows a structure of a connection state of a protection plate 40, a first connector 50, a first base plate 60, and a second base plate 90 according to an embodiment. FIG. 16 schematically shows a partial cross-sectional structure of an electronic device 10 according to an embodiment. Referring to FIG. 15 and FIG. 16, the electronic device 10 further includes a second base plate 90. One of a backplane 32 and a protection plate 40 is connected to the second base plate 90. The second base plate 90 is located on one side that is of a first base plate 60 and that is away from a first connector 50. One of the backplane 32 and the protection plate 40 is connected to the second base plate 90, so that the second base plate 90 is fastened to one of the backplane 32 and the protection plate 40, and the other of the backplane 32 and the protection plate 40 is not connected to the second base plate 90. Therefore, when the backplane 32 moves away from the protection plate 40, the backplane 32 and the protection plate 40 do not exert a tension stress on the second base plate 90, thereby reducing a possibility that the electronic device 10 generates an abnormal sound or deformation of the backplane 32 because the second base plate 90 bears a relatively large tension stress and is peeled off from one of the backplane 32 and the protection plate 40.

In some examples, at least a part of the second base plate 90 is located between a bendable area 321 of the backplane 32 and the protection plate 40, that is, at least a part of the second base plate 90 is located on an inner side of the bendable area 321 of the backplane 32. It should be noted that the fact that at least a part of the second base plate 90 is located on an inner side of the bendable area 321 of the backplane 32 means that an orthographic projection of the part of the second base plate 90 overlaps with an orthographic projection of the bendable area 321 along a thickness direction Z. For example, the second base plate 90 is wholly located between the bendable area 321 and the protection plate 40, that is, the second base plate 90 is wholly located on the inner side of the bendable area 321 of the backplane 32. In the thickness direction Z, an orthographic projection of the second base plate 90 may be located in an orthographic projection of the bendable area 321. The second base plate 90 may separate the backplane 32 from the protection plate 40, so that when the backplane 32 is bent, there is no direct contact between the bendable area 321 and the protection plate 40, but the bendable area 321 and the protection plate 40 may separately come into contact with the second base plate 90, thereby reducing a possibility that the bendable area 321 and the protection plate 40 generate noise or structural abrasion due to mutual impact or relative slip after the bendable area 321 and the protection plate 40 directly come into contact with each other.

In some implementations, the protection plate 40 is connected to the second base plate 90, and the backplane 32 is not connected to the second base plate 90. A thickness of the second base plate 90 is less than a thickness of the first base plate 60. Therefore, when the electronic device 10 is in an unfolded state, there is a spacing between the backplane 32 and the second base plate 90, so that there is no contact between the backplane 32 and the second base plate 90. Alternatively, the backplane 32 is connected to the second base plate 90. A thickness of the second base plate 90 is less than a thickness of the first base plate 60. Therefore, when the electronic device 10 is in an unfolded state, there is a spacing between the protection plate 40 and the second base plate 90, so that there is no contact between the protection plate 40 and the second base plate 90.

Because a spacing between the bendable area 321 of the backplane 32 and the protection plate 40 is relatively small, and a thickness error exists between the backplane 32, the second base plate 90, and the protection plate 40 in a processing and manufacturing process, when the thickness of the second base plate 90 is greater than a spacing between the bendable area 321 and the protection plate 40, the second base plate 90 exerts a jacking force on the bendable area 321, so that the bendable area 321 has a bump. In this embodiment, a manner in which the thickness of the second base plate 90 is less than the thickness of the first base plate 60 can reduce a processing precision requirement of the backplane 32, the second base plate 90, and the protection plate 40, and avoid a case in which the second base plate 90 jacks up the bendable area 321.

In some examples, there may be a spacing between the first base plate 60 and the second base plate 90, so that there is no contact between the first base plate 60 and the second base plate 90, and then there is a buffer space between the first base plate 60 and the second base plate 90. When at least one of the first base plate 60 and the second base plate 90 expands toward each other, a possibility of mutual extrusion between the first base plate 60 and the second base plate 90 may be reduced.

In some implementations, the second base plate 90 is disposed on a surface that is of the protection plate 40 and that faces the backplane 32. The second base plate 90 has a predetermined thickness, so the second base plate 90 has specific stiffness. If the second base plate 90 is disposed on the backplane 32, because the backplane 32 has a relatively small thickness, the disposed second plate 90 has a possibility of strengthening stiffness of a corresponding area on the backplane 32, so that a deformation capability of the backplane 32 corresponding to the area of the second base plate 90 is weaker than a deformation capability of another area, and therefore there is a possibility of inconsistent deformation of the backplane 32, which affects a display effect of the flexible display 31. In this embodiment, a manner in which the second base plate 90 is fastened to the protection plate 40 may avoid the foregoing case.

In some examples, the protection plate 40 is bonded to the second base plate 90, so that no additional connection component such as a screw, a buckle, or a rivet needs to be disposed between the protection plate 40 and the second base plate 90. Therefore, on one hand, complexity of a connection structure between the protection plate 40 and the second base plate 90 is reduced, and assembling difficulty is reduced. On the other hand, a corresponding connection structure, such as a hole, does not need to be disposed on the protection plate 40 and the second base plate 90, which reduces processing difficulty of the protection plate 40 and the second base plate 90. In some examples, glue is applied to a predetermined position of at least one of the protection plate 40 and the second base plate 90, and then the protection plate 40 is bonded to the second base plate 90. After the glue is cured, the second base plate 90 and the protection plate 40 are firmly connected, and the two cannot be easily separated. In some other examples, the second base plate 90 includes a sticky surface. The second base plate 90 may be directly stuck to a surface that is of the protection plate 40 and that faces the backplane 32.

In an embodiment in which the protection plate 40 is bonded to the second base plate 90, when the backplane 32 is separated from the second base plate 90, the backplane 32 does not generate the tension stress on the second base plate 90, so that a bonding layer between the second base plate 90 and the protection plate 40 does not peel off from the protection plate 40 and generate an abnormal sound.

In some implementations, a material of the second base plate 90 is an insulating material, so that the second base plate 90 may insulate and isolate the backplane 32 and the protection plate 40, thereby reducing a possibility that an electrical signal is transmitted between the backplane 32 and the protection plate 40 by using the second base plate 90. The second base plate 90 has good flexibility. When the backplane 32 comes into contact with the second base plate 90, the backplane 32 and the second base plate 90 cannot easily generate a case of noise due to mutual impact or friction between the two. This improves mute degree in a switching process of the electronic device 10 between the unfolded state and the folded state, and also reduces a possibility that the backplane 32 is scratched by the second base plate 90 and scratches occur. In some examples, the second base plate 90 may be a plastic diaphragm or a plastic film. For example, a material of the second base plate 90 may include, but is not limited to, polyvinyl chloride, polyethylene, polypropylene, or polystyrene. For example, a material of the first base plate 60 may be the same as a material of the second base plate 90.

In some implementations, the first base plate 60 and the second base plate 90 are integrally formed. Both the first base plate 60 and the second base plate 90 are connected to the protection plate 40. For example, the integrally formed first base plate 60 and the integrally formed second base plate 90 may be manufactured in a mold processing manner.

In some implementations, the first base plate 60 and the second base plate 90 are integrally formed. Both the first base plate 60 and the second base plate 90 are connected to the backplane 40.

Figure 17:
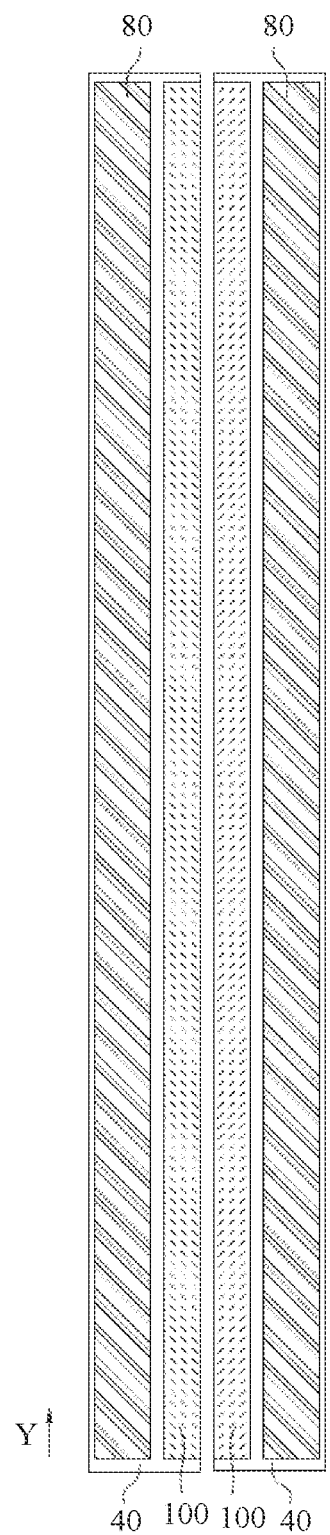
FIG. 17 is a schematic diagram of a structure of a connection state of a protection plate, a third connector, and a third base plate according to an embodiment of this application.

In some implementations, FIG. 17 schematically shows a structure of a connection state of a protection plate 40, a third connector 80, and a third base plate according to an embodiment. Referring to FIG. 16 and FIG. 17, the electronic device 10 further includes a third base plate 100. The third base plate 100 is located between the protection plate 40 and the housing 20. In a thickness direction Z, an orthographic projection of the third base plate 100 may overlap with an orthographic projection of the protection plate 40. One of the housing 20 and the protection plate 40 is connected to the third base plate 100. One of the housing 20 and the protection plate 40 is connected to the third base plate 100, so that the third base plate 100 is fastened to one of the housing 20 and the protection plate 40, and the other of the housing 20 and the protection plate 40 is not connected to the third base plate 100. Therefore, when the protection plate 40 moves away from the housing 20, the housing 20 and the protection plate 40 do not exert a tension stress on the third base plate 100, thereby reducing a possibility that the electronic device 10 generates an abnormal sound because the third base plate 100 bears a relatively large tension stress and is peeled off from one of the housing 20 and the protection plate 40.

In addition, the third base plate 100 may separate the housing 20 from the protection plate 40. There is no direct contact between the housing 20 and the protection plate 40, but the housing 20 and the protection plate 40 may separately come into contact with the third base plate 100, thereby reducing a possibility that noise or structural abrasion occurs between the housing 20 and the protection plate 40 due to mutual impact or relative slip after the housing 20 and the protection plate 40 come into contact with each other.

In some examples, at least a part of the third base plate 100 is located below the bendable area 321. For example, the third base plate 100 is wholly located below the bendable area 321. For example, a thickness of the third base plate 100 is less than a spacing between the housing 20 and the protection plate 40. For example, a thickness of the third base plate 100 is less than a thickness of the first base plate 60.

In some examples, the protection plate 40 is connected to the third base plate 100, and the housing 20 is not connected to the third base plate 100. When the electronic device 10 is in an unfolded state, there is a spacing between the housing 20 and the third base plate 100, so that there is no contact between the housing 20 and the third base plate 100.

Alternatively, the housing 20 is connected to the third base plate 100. When the electronic device 10 is in an unfolded state, there is a spacing between the protection plate 40 and the third base plate 100, so that there is no contact between the protection plate 40 and the third base plate 100.

In some examples, the third base plate 100 is disposed on a surface that is the protection plate 40 and that is away from the backplane 32. The protection plate 40 is bonded to the third base plate 100, so that no additional connection component such as a screw, a buckle, or a rivet needs to be disposed between the protection plate 40 and the third base plate 100. Therefore, on one hand, complexity of a connection structure between the protection plate 40 and the third base plate 100 is reduced, and assembling difficulty is reduced. On the other hand, a corresponding connection structure, such as a hole, does not need to be disposed on the protection plate 40 and the third base plate 100, which reduces processing difficulty of the protection plate 40 and the third base plate 100. For example, glue is applied to a predetermined position of at least one of the protection plate 40 and the third base plate 100, and then the protection plate 40 is bonded to the third base plate 100. After the glue is cured, the third base plate 100 and the protection plate 40 are firmly connected, and the two cannot be easily separated. For example, the third base plate 100 includes a sticky surface. The third base plate 100 may be directly stuck to a surface that is of the protection plate 40 and that faces the backplane 20.

In an embodiment in which the protection plate 40 is bonded to the third base plate 100, when the housing 20 is separated from the third base plate 100, the housing 20 does not generate the tension stress on the third base plate 100, so that a bonding layer between the third base plate 100 and the protection plate 40 does not peel off from the protection plate 40 and generate an abnormal sound.

In some examples, a material of the third base plate 100 is an insulating material, so that the third base plate 100 insulates and isolates the housing 20 and the protection plate 40, thereby reducing a possibility that an electrical signal is transmitted between the housing 20 and the protection plate 40 by using the third base plate 100. The third base plate 100 has good flexibility. When the housing 20 comes into contact with the third base plate 100, the housing 20 and the third base plate 100 cannot easily generate a case of noise due to mutual impact or friction between the two. This improves mute degree in a switching process of the electronic device 10 between the unfolded state and the folded state, and also reduces a possibility that the housing 20 is scratched by the third base plate 100 and scratches appear. In some examples, the third base plate 100 may be a plastic diaphragm or a plastic film. For example, a material of the third base plate 100 may include, but is not limited to, polyvinyl chloride, polyethylene, polypropylene, or polystyrene. For example, a material of the first base plate 60, a material of the second base plate 90, and a material of the third base plate 100 are the same.

In some examples, the electronic device 10 further includes a third connector 80. Both the third connector 80 and the third base plate 100 are located on a same side of the protection plate 40. The third base plate 100 is located on one side that is of the third connector 80 and that faces the bendable area 321. For example, there may be a spacing between the third connector 80 and the third base plate 100, so that there is no contact between the third connector 80 and the third base plate 100, so that a buffer space is formed between the third connector 80 and the third base plate 100. When at least one of the third connector 80 and the third base plate 100 expands toward each other, a possibility of mutual extrusion between the third connector 80 and the third base plate 100 may be reduced.

In some implementations, a quantity of protection plates 40 is two. The two protection plates 40 are separately connected to the two supporters 21. An arrangement direction of the two protection plates 40 is the same as an arrangement direction of the two supporters 21. A gap 110 is formed between the two protection plates 40, so that there is no contact between the two protection plates 40. Each protection plate 40 may block a hole 20*a* or a concave part 20*b* that is disposed in a corresponding area on the housing 20. An area corresponding to the gap 110 between the housing 20 and the two protection plates 40 does not include a hole 20*a* or a concave part 20*b*.

Referring to FIG. 16, when the electronic device 10 is in an unfolded state, there is a predetermined spacing between the backplane 32 and the protection plate 40, and the backplane 32 and the protection plate 40 do not come into contact with each other; and there is a predetermined spacing between the protection plate 40 and the housing 20, and the protection plate 40 and the housing 20 do not come into contact with each other.

Figure 18:
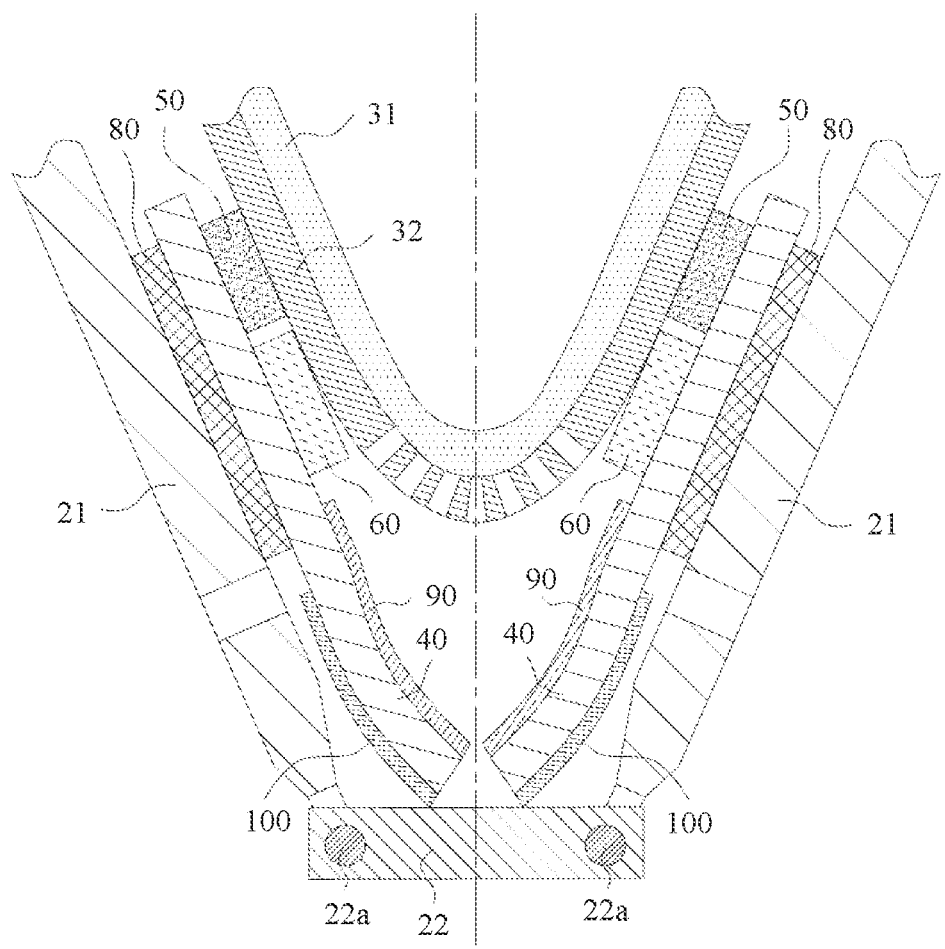
FIG. 18 is a schematic diagram of a partial cross-sectional structure of an electronic device in a semi-folded state according to another embodiment of this application.

FIG. 18 schematically shows a partial cross-sectional structure of an electronic device 10 in a semi-folded state according to an embodiment. Referring to FIG. 18, in a process in which the electronic device 10 switches from an unfolded state to a folded state, a bendable area 321 of a backplane 32 is bent, and a part that is of each protection plate 40 and that is located below the bendable area 321 moves close to a housing 20, for example, moves close to a rotating assembly 22. After the part that is of the protection plate 40 and that is located below the bendable area 321 comes into contact with the housing 20, the protection plate 40 starts to be limited or restricted by the housing 20. The bendable area 321 of the backplane 32 continues to bend, and the protection plate 40 that abuts on the housing 20 also starts to bend. In some cases, after the protection plate 40 abuts on the housing 20, the protection plate 40 may slide relative to the housing 20 when the bendable area 321 of the backplane 32 continues to bend.

In a process in which the electronic device 10 switches from the folded state to the unfolded state, the bendable area 321 of the backplane 32 gradually unfolds, and a bent part of each protection plate 40 also gradually unfolds. The bendable area 321 of the backplane 32 continues to unfold, the protection plate 40 is finally disengaged from the housing 20, and gradually moves away from the housing 20. After the backplane 32 is completely flattened, two protection plates 40 return to original positions. Because there is a gap 110 between the two protection plates 40, there is no contact between the two protection plates 40, thereby reducing a possibility of abnormal sound, noise, or abrasion of the two protection plates 40 due to mutual impact or relative extrusion between the two protection plates 40.

In some examples, when a second base plate 90 is disposed on the protection plate 40, the protection plate 40 abuts on the backplane 32 by using the second base plate 90. When the third base plate 100 is disposed on the protection plate 40, the protection plate 40 abuts on the housing 20 by using the third base plate 100.

Figure 19:
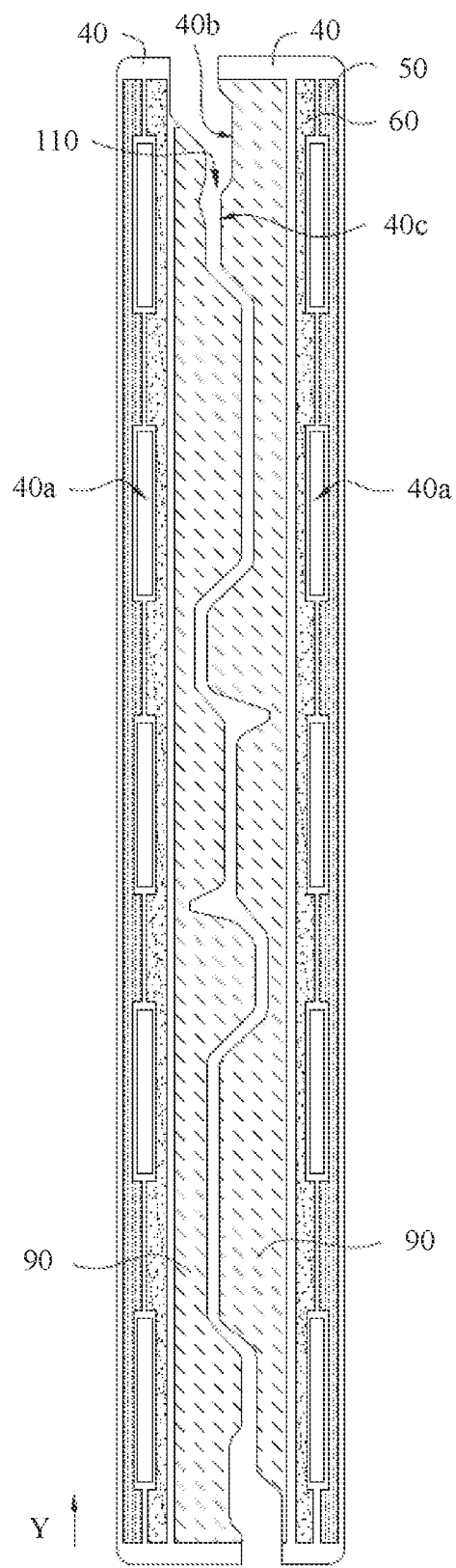
FIG. 19 is a schematic diagram of a structure of a connection state of a protection plate, a first connector, a first base plate, and a second base plate according to another embodiment of this application.

In some examples, FIG. 19 schematically shows a structure of a connection state of a protection plate 40, a first connector 50, a first base plate 60, and a second base plate 90 according to another embodiment. Referring to FIG. 19, in the two protection plates 40, a surface that is of one protection plate 40 and that faces the other protection plate 40 may be an irregular surface that includes a concave surface 40b and a convex surface 40c. The concave surface 40b and the convex surface 40c of one protection plate 40 respectively cooperate with the convex surface 40c and the concave surface 40b of the other protection plate 40, so that the gap 110 formed between the two protection plates 40 is in an irregular shape. For example, the width of the gap 110 formed between the two protection plates 40 at two different positions may change, for example, a width at one position may be less than a width at the other position. Alternatively, a width of the gap 110 formed between the two protection plates 40 is the same at any position, that is, a width of the gap 110 does not change. For example, a surface that is of one protection plate 40 and that is away from the other protection plate 40 is a flat surface.

In some other examples, in the two protection plates 40, the surface that is of one protection plate 40 and that is away from the other protection plate 40 is a flat surface, so that the gap 110 formed between the two protection plates 40 may be in a linear shape extending along an axial direction Y A width of the gap 110 formed between the two protection plates 40 is the same at any position, that is, a width of the gap 110 does not change. For example, structures of the two protection plates 40 are the same. Therefore, on one hand, in a processing process, the protection plate 40 of a structure may be manufactured, which reduces processing difficulty of the protection plate 40. On the other hand, when the protection plate 40 is assembled with the housing 20, it is no longer necessary to sort the protection plates 40 of different structures to assemble, which improves assembly working efficiency. For example, a surface that is of one protection plate 40 and that is away from the other protection plate 40 is a flat surface.

Figure 20:
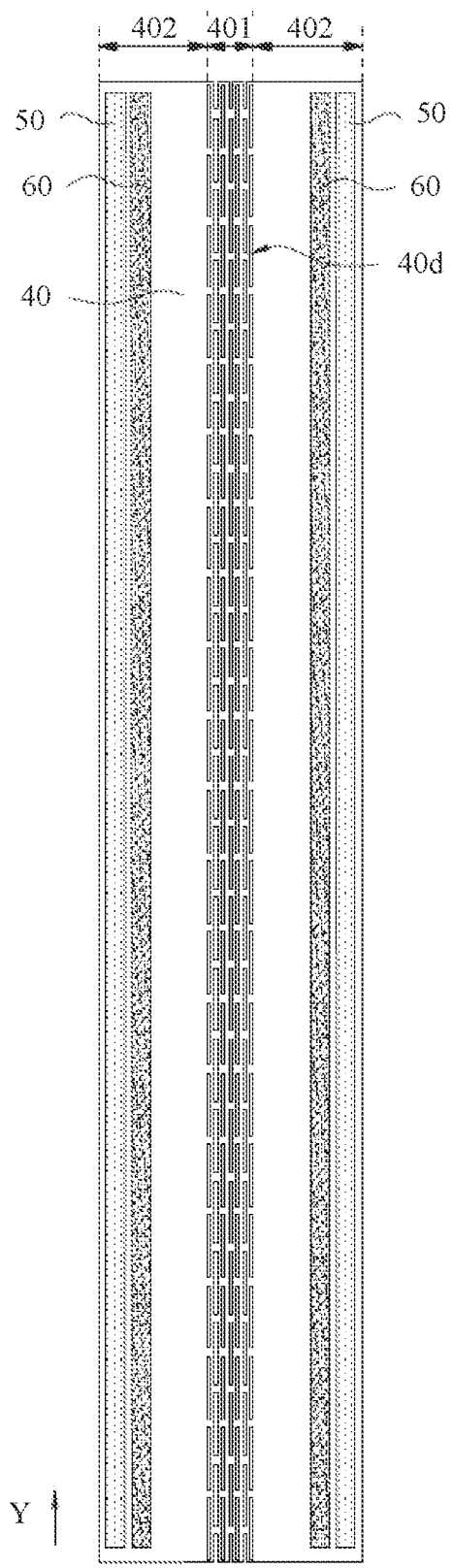
FIG. 20 is a schematic diagram of a structure of a connection state of a protection plate, a first connector, and a first base plate according to another embodiment of this application.
Figure 21:
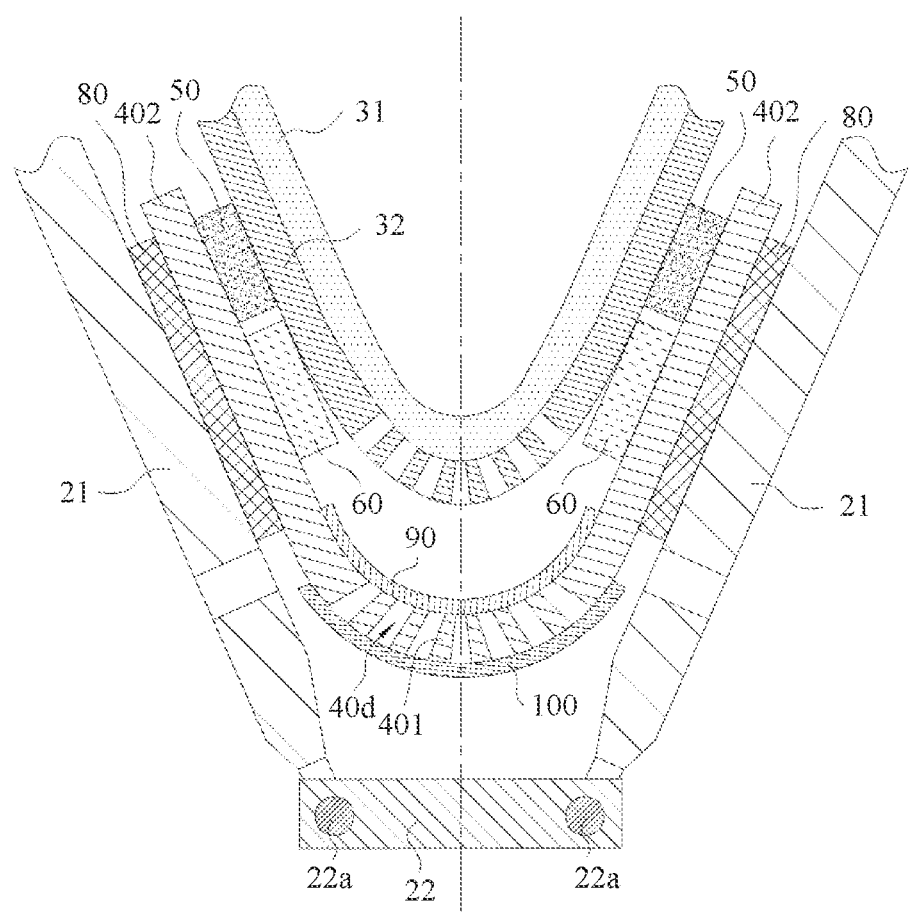
FIG. 21 is a schematic diagram of a partial cross-sectional structure of an electronic device in a semi-folded state according to still another embodiment of this application.

In some implementations, FIG. 20 schematically shows a structure of a connection state of a protection plate 40, a first connector 50, and a first base plate 60 according to another embodiment. FIG. 21 schematically shows a partial cross-sectional structure of an electronic device 10 in a semi-folded state according to an embodiment. Referring to FIG. 20 and FIG. 21, a quantity of protection plates 40 is one. The protection plate 40 includes a bendable segment 401 and a transfer segment 402. The bendable segment 401 is disposed between the two transfer segments 402. The bendable segment 401 of the protection plate 40 is disposed corresponding to the bendable area 321 of the backplane 32. The bendable segment 401 of the protection plate 40 is located below the bendable area 321 of the backplane 32. The two transfer segments 402 of the protection plate 40 are separately connected to the two supporters 21 of the housing 20. The first connector 50 connects the backplane 32 and the transfer segment 402 of the protection plate 40. The first base plate 60 is disposed between the backplane 32 and the transfer segment 402 of the protection plate 40. For example, the first base plate 60 is disposed on the transfer segment 402 of the protection plate 40.

The bendable segment 401 of the protection plate 40 is a stiffness weakening area. Stiffness of each of the two transfer segments 402 is higher than stiffness of the bendable segment 401, so that the protection plate 40 may be bent relatively easily in the bendable segment 401. In some examples, thicknesses of the two transfer segments 402 are greater than the thickness of the bendable segment 401, so as to reduce the stiffness of the bendable segment 401, thereby facilitating bending deformation of the bendable segment 401 when being subjected to a relatively small force. In some other examples, a plurality of through holes 40d may be disposed on the bendable segment 401, so as to reduce the stiffness of the bendable segment 401, thereby facilitating bending deformation of the bendable segment 401 when being subjected to a relatively small force. For example, a through hole 40d is disposed penetrating through the protection plate 40.

When the electronic device 10 is in an unfolded state, there is a predetermined spacing between the backplane 32 and the protection plate 40, and the backplane 32 and the protection plate 40 do not come into contact with each other; and there is a predetermined spacing between the protection plate 40 and the housing 20, and the protection plate 40 and the housing 20 do not come into contact with each other. In a process in which the electronic device 10 switches from the unfolded state to the folded state, a bendable area 321 of the backplane 32 is bent, and a bendable segment 401 of the protection plate 40 is also bent synchronously. The bendable area 321 of the backplane 32 continues to bend, and a bending degree of the bendable segment 401 of the protection plate 40 gradually increases. In some cases, the bendable segment 401 of the protection plate 40 may abut on the housing 20. The bendable area 321 of the backplane 32 may come into contact with the bendable segment 401 of the protection plate 40.

In a process in which the electronic device 10 switches from the folded state to the unfolded state, the bendable area 321 of the backplane 32 gradually unfolds, and the flexible segment 401 of the protection plate 40 also gradually unfolds synchronously.

Because the protection plate 40 is an integrated structure, in a process in which the electronic device 10 switches from a folded state to an unfolded state, the protection plate 40 cannot be easily inserted into a hole 20a or a concave part 20b on a housing 20, thereby reducing a possibility that the electronic device 10 cannot continue to unfold because the protection plate 40 is stuck during insertion of the protection plate 40 into the housing 20 and cannot be moved.

In some examples, when a second base plate 90 is disposed on the protection plate 40, the second base plate 90 may cover the bendable segment 401 of the protection plate 40. When a third base plate 100 is disposed on the protection plate 40, the third base plate 100 may cover the bendable segment 401 of the protection plate 40.

In some implementations, a thickness of the backplane 32 is greater than a thickness of the protection plate 40. Stiffness of the protection plate 40 is lower than stiffness of the backplane 32. When the backplane 32 transitions from an unfolded state to a folded state, the bendable area 321 of the backplane 32 is bent and deformed, and the protection plate 40 is also bent and deformed. Compared with the backplane 32, the protection plate 40 has lower stiffness, so that the protection plate 40 is easily bent and deformed relative to the backplane 32. This reduces a possibility that the protection plate 40 exerts great resistance on a bending process the backplane 32 because the protection plate 40 cannot be bent and affects the stability of the bending process of the backplane 32.

In some examples, a value range of the thickness of the protection plate 40 may be, but is not limited to, 0.02 mm to 0.05 mm. For example, a thickness of the protection plate 40 may range from 0.02 mm to 0.04 mm.

In some examples, both the backplane 32 and the protection plate 40 are structural members with uniform thicknesses. A material of the backplane 32 may be the same as a material of the protection plate 40.

In the descriptions of embodiments of this application, it should be noted that unless otherwise specified and defined explicitly, the terms "mount", "connected to" and "connect"

should be understood in a broad sense, and for example, may be a fixed connection or an indirect connection by using an intermediate medium, or may be internal communication between two elements or an interaction relationship between two elements. A person of ordinary skill in the art can understand specific meanings of the foregoing terms in embodiments of this application based on a specific situation.

The device or element referred to in or implied in embodiments of this specification needs to have a specific orientation, be constructed and operated in a specific orientation, and therefore cannot be construed as a limitation on embodiments of this specification. In the descriptions of embodiments of this application, "a plurality of" means two or more, unless otherwise specifically defined.

In the specification of embodiments, claims, and accompanying drawings of this application, the terms "first", "second", "third", "fourth", and the like (if existent) are intended to distinguish between similar objects but do not necessarily indicate a specific order or sequence. It should be understood that the data termed in such a way is interchangeable in proper circumstances, so that embodiments described herein can be implemented in orders except the order illustrated or described herein. In addition, the terms "include" and "have", and any variations thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

The term "a plurality of" in this specification refers to two or more than two. In this specification, the term "and/or" is only used to describe an association relationship between associated objects, and indicates that three relationships may exist. For example, A and/or B may indicate the following: Only A exists, both A and B exist, and only B exists. In addition, the symbol "/" in this specification usually indicates an "or" relationship between the associated objects. In the formula, the symbol "/" indicates a "division" relationship between the associated objects.

It can be understood that various numeric numbers used in embodiments of this application are merely described for easy differentiation, and are not intended to limit the scope of embodiments of this application.

It should be understood that, in embodiments of this application, sequence numbers of the foregoing processes do not mean execution sequences. The execution sequences of the processes should be determined based on functions and internal logic of the processes, and should not be construed as any limitation on the implementation processes of embodiments of this application.

What is claimed is:

1. An electronic device, comprising:
a housing with a rotating assembly and two supporters, wherein the rotating assembly is disposed between the two supporters, and the two supporters are rotatably connected to the rotating assembly;
a flexible display on the housing, wherein the flexible display comprises a backplane, and wherein the backplane comprises a bendable area;
a first base plate;
a protection plate disposed between the backplane and the housing, wherein the first base plate is bonded to the protection plate, and wherein when the electronic device is in an unfolded state, a part of the protection plate overlaps the bendable area and is located between the bendable area and the housing; and
wherein a first portion of the protection plate and a first portion of the backplane are bonded to each other, wherein the first portion of the backplane is outside the bendable area;
wherein the first base plate is disposed between the backplane and the protection plate, wherein a first portion of the first base plate does not overlap the bendable area when the electronic device is in the unfolded state; and
wherein the backplane and the first portion of the first base plate that does not overlap the bendable area are configured to be freely separated from each other when the electronic device is in a semi-folded state.

2. The electronic device of claim 1, wherein a material of the first base plate is an insulating material.

3. The electronic device of claim 1, wherein an entirety of the first base plate does not overlap the bendable area when the electronic device is in the unfolded state.

4. The electronic device of claim 1, wherein the first portion of the protection plate and the first portion of the backplane are bonded to each other with a first connector, wherein a maximum thickness of the first connector is equal to a maximum thickness of the first base plate.

5. The electronic device of claim 4, further comprising:
wherein the protection plate comprises a through hole, the through hole does not overlap the bendable area when the electronic device is in the unfolded state; and
wherein a second connector passes through the through hole and is bonded to the backplane and the housing, and wherein the first connector and the first base plate are disposed around the second connector.

6. The electronic device of claim 5, wherein at least one of the first connector or the first base plate is bonded to the second connector.

7. The electronic device of claim 5, wherein the second connector is a bonding member.

8. The electronic device of claim 4, wherein the first connector is a bonding member.

9. The electronic device of claim 1, wherein a thickness of the backplane is greater than a thickness of the protection plate.

10. The electronic device of claim 1, wherein a material of the backplane comprises at least one of iron, titanium, nickel, or chromium elements.

11. The electronic device of claim 1, further comprising:
a third connector bonded to the protection plate and the housing.

12. The electronic device of claim 11, wherein the third connector is a bonding member.

13. The electronic device of claim 1, further comprising:
a second base plate;
wherein the second base plate is bonded to the protection plate;
wherein the second base plate is disposed between the backplane and the protection plate, wherein a first portion of the second base plate does not overlap the bendable area when the electronic device is in the unfolded state; and
wherein the backplane and the first portion of the second base plate that does not overlap the bendable area are configured to be freely separated from each other when the electronic device is in the semi-folded state.

14. The electronic device of claim 13, wherein a thickness of the second base plate is less than a thickness of the first base plate, and a surface that is of the first base plate and that faces the backplane is higher than a surface that is of the second base plate and that faces the backplane.

15. The electronic device of claim 13, wherein the protection plate is bonded to the second base plate with a second connector.

16. The electronic device of claim 13, wherein a material of the second base plate is an insulating material.

17. The electronic device of a claim 1, further comprising:
a third base plate, wherein the third base plate is located between the protection plate and the housing.

* * * * *

UNITED STATES PATENT AND TRADEMARK OFFICE
CERTIFICATE OF CORRECTION

PATENT NO. : 12,292,761 B2  
APPLICATION NO. : 18/015473  
DATED : May 6, 2025  
INVENTOR(S) : Zhang et al.

Page 1 of 1

It is certified that error appears in the above-identified patent and that said Letters Patent is hereby corrected as shown below:

On the Title Page

Page 2, Item (56) Foreign Patent Documents, Citation 12: "IN 108230907 A 6/2018" should read -- CN 108230907 A 6/2018 --.

Signed and Sealed this  
Tenth Day of June, 2025

Coke Morgan Stewart  
*Acting Director of the United States Patent and Trademark Office*